United States Patent
Shim et al.

(10) Patent No.: US 9,826,077 B2
(45) Date of Patent: Nov. 21, 2017

(54) APPARATUS AND METHOD FOR UNLOCKING A LOCKING MODE OF PORTABLE TERMINAL

(75) Inventors: Su Mi Shim, Gyeonggi-do (KR); Su Jung Youn, Gyeonggi-do (KR)

(73) Assignee: Samsung Electronics Co., Ltd., Yeongtong-gu, Suwon-si, Gyeonggi-do (KR)

(*) Notice: Subject to any disclaimer, the term of this patent is extended or adjusted under 35 U.S.C. 154(b) by 1065 days.

(21) Appl. No.: 12/787,768

(22) Filed: May 26, 2010

(65) Prior Publication Data

US 2010/0306718 A1 Dec. 2, 2010

(30) Foreign Application Priority Data

May 26, 2009 (KR) .................. 10-2009-0046006

(51) Int. Cl.
*G06F 3/0488* (2013.01)
*H04M 1/67* (2006.01)
*G06F 21/32* (2013.01)
*G06F 21/31* (2013.01)
*G06F 21/36* (2013.01)
*H04W 12/12* (2009.01)
*H04M 1/725* (2006.01)

(52) U.S. Cl.
CPC .......... *H04M 1/67* (2013.01); *G06F 3/04883* (2013.01); *G06F 21/31* (2013.01); *G06F 21/32* (2013.01); *G06F 21/36* (2013.01); *H04W 12/12* (2013.01); *G06F 2221/2147* (2013.01); *H04M 1/72547* (2013.01); *H04M 2250/22* (2013.01)

(58) Field of Classification Search
CPC ....... G06F 3/04883; G06F 2203/04808; G06F 3/0488; G06F 3/04847; G06F 2203/0381
See application file for complete search history.

(56) References Cited

U.S. PATENT DOCUMENTS

| | | | |
|---|---|---|---|
| 8,127,254 B2* | 2/2012 | Lindberg et al. | 715/863 |
| 2005/0079896 A1* | 4/2005 | Kokko et al. | 455/566 |
| 2006/0026536 A1 | 2/2006 | Hotelling et al. | |
| 2007/0150842 A1 | 6/2007 | Chaudhri et al. | |
| 2008/0036743 A1 | 2/2008 | Westerman et al. | |
| 2008/0094371 A1 | 4/2008 | Forstall et al. | |

(Continued)

FOREIGN PATENT DOCUMENTS

| | | | | |
|---|---|---|---|---|
| KR | 10-2000-0002249 A | | 1/2000 | |
| KR | 10-0795750 | | 1/2008 | ............... H04B 1/40 |

(Continued)

OTHER PUBLICATIONS

"Samsung S5230 preview: First Look—GSMArena.com"; Mar. 18, 2009; http://www.gsmarena.com/samsung_s5230-review-335.php. Mar. 11 2009; http://digit.tech.qq.com/a/20090311/000010.htm.

*Primary Examiner* — Namitha Pillai
(74) *Attorney, Agent, or Firm* — Cha & Reiter, LLC

(57) ABSTRACT

A method of unlocking a locking mode of a portable terminal, which includes sensing a user's gesture input which is set in a locking mode of the portable terminal. The locking mode is unlocked in response to the user's gesture input, and a function mapped to the user's gesture can be executed when unlocking the locking mode. A portable terminal compares gestures among predefined sets of gesture information in order to check whether there is a gesture that coincides with the analyzed gesture.

25 Claims, 13 Drawing Sheets

(56) References Cited

U.S. PATENT DOCUMENTS

| | | | |
|---|---|---|---|
| 2008/0249643 A1* | 10/2008 | Nelson | 700/94 |
| 2009/0241072 A1 | 9/2009 | Chaudhri et al. | |
| 2009/0291711 A1* | 11/2009 | Hsu | 455/558 |
| 2010/0146437 A1* | 6/2010 | Woodcock et al. | 715/806 |
| 2010/0162182 A1 | 6/2010 | Oh et al. | |

FOREIGN PATENT DOCUMENTS

| | | | |
|---|---|---|---|
| KR | 2008-035133 | 4/2008 | H04B 1/40 |
| KR | 2008-041937 | 5/2008 | G06F 15/00 |
| KR | 10-2008-0079333 A | 8/2008 | |
| KR | 10-2010-0073743 A | 7/2010 | |

\* cited by examiner

APPARATUS AND METHOD FOR UNLOCKING A LOCKING MODE OF PORTABLE TERMINAL

CLAIM OF PRIORITY

This application claims the benefit of priority from Korean Patent Application No. 10-2009-0046006 filed May 26, 2009, the contents of which are hereby incorporated by reference in its entirety.

BACKGROUND OF THE INVENTION

1. Field of the Invention

The present invention relates to a method and apparatus for controlling a portable terminal. More particularly, the present invention relates to a method and apparatus for unlocking a locking mode of a portable terminal in a portable terminal having a touch screen.

2. Description of the Related Art

Recently, as communication technologies have rapidly developed, portable terminal functions become more and more sophisticated, and various user interfaces and various functions using such user interfaces are now being provided and have greatly increased the usefulness and popularity of such devices.

In particular, a portable terminal having a touch screen includes various methods of input device locking/unlocking functions in order to prevent unnecessary input errors while in an idle state, as inadvertent contact while the terminal is clipped to one's waist or in one's bag can create unexpected problems with use.

Conventionally, a portable terminal unlocks a locking mode by an input of a password, which is defined in advance, or is defined by user's setting in order to unlock the locking mode (touch screen hold state), or unlocks the locking mode using an unlocking key which is separately prepared.

However, in the above-mentioned conventional methods, user may forget the password, and a user, who desires to quickly unlock the locking mode, may feel inconvenienced by having to type in a combination of numbers and letters. In addition, in case of the conventional unlocking of the locking mode, when the unlocking of the locking mode is completed, the initial menu of the portable terminal is displayed. Hence, in case the portable terminal user desires to use a specific function of the portable terminal after the locking mode is unlocked, the user is required to inconveniently perform the process of entering prompts in the menu for performing the particular function user desires to use.

SUMMARY OF THE INVENTION

The present invention has been made to provide a method and apparatus for more conveniently unlocking a locking mode of a portable terminal.

The present invention further provides a method and apparatus for promptly entering a desired user function after unlocking a locking mode of a portable terminal.

The present invention further provides a method and apparatus for conveniently unlocking a locking mode in a portable terminal having a touch screen or a touch pad according to a user's gesture input.

The present invention further provides a method and apparatus for promptly executing a function in a portable terminal having a touch screen or a touch pad corresponding to a user's gesture when unlocking a locking mode according to the user's gesture.

The present invention further provides a method and apparatus for displaying information according to a user's gesture, which can unlock a locking mode, and function information mapped thereto, and for promptly executing the function mapped to the corresponding gesture along with the locking mode when the preset specific gesture is inputted.

In accordance with an exemplary aspect of the present invention, a method of unlocking a locking mode of a portable terminal preferably includes: sensing a user's gesture input has been previously set when in a locking mode of the portable terminal; unlocking the locking mode in response to sensing the user's gesture input; and executing a function mapped to the user's gesture input when unlocking the locking mode.

In accordance with another exemplary aspect of the present invention, a method of unlocking a locking mode of a portable terminal preferably includes: sensing an external input in a locking mode of an input device; activating a gesture input mode corresponding to the external input; sensing a gesture input in the gesture input mode; unlocking the locking mode if the gesture corresponds to preset gesture information; and executing a function information mapped to the gesture information when unlocking the locking mode.

In accordance with another exemplary aspect of the present invention, a method of setting an unlocking object for unlocking a locking mode in a portable terminal, preferably includes: providing a plurality of categories which are divided by functions for setting gesture information in response to a user's request; displaying characters for setting gesture information when a category of a specific function is selected from among the divided categories; setting a corresponding character according to a user's selection from among the characters as the gesture information; and mapping the set gesture information to the function information of the category, and storing the mapping.

In accordance with another exemplary aspect of the present invention, a portable terminal preferably includes: a display unit for displaying at least one set of information that is set when on-controlled in a locking mode; an input device for entering a gesture input mode according to a specific input when the specific input is sensed in the locking mode, and is inputted a user's gesture; and a controller which determines whether the locking mode will be unlocked according to a gesture input transmitted by the input device in the locking mode, and controls execution of a function corresponding to the gesture when the locking mode is unlocked.

BRIEF DESCRIPTION OF THE DRAWINGS

The above and other exemplary aspects, features, and advantages of certain exemplary embodiments of the present invention will become more apparent from the following description taken in conjunction with the accompanying drawings, in which.

DETAILED DESCRIPTION

Figure 1:
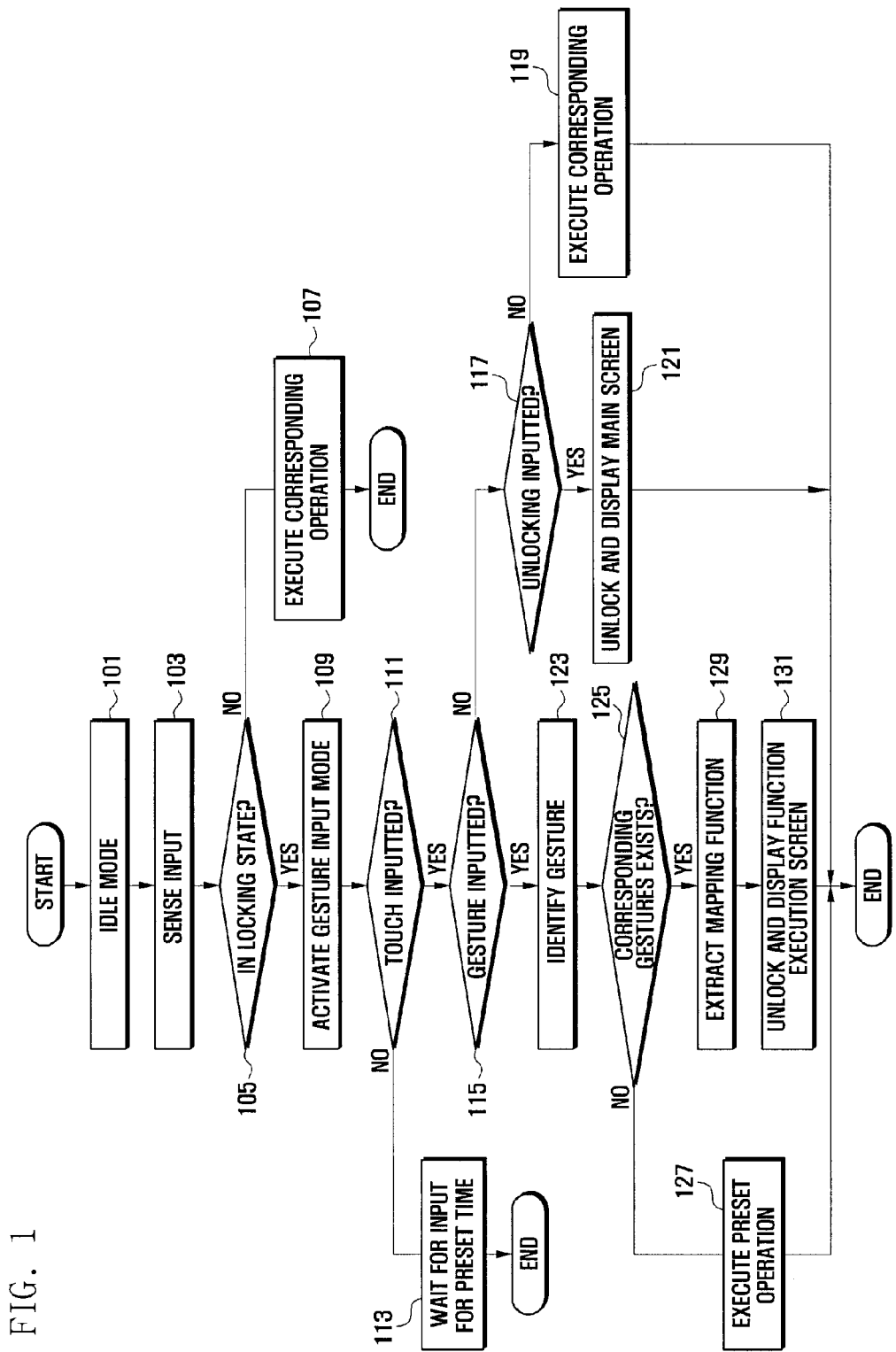
FIG. 1 illustrates a method of unlocking a locking mode of a portable terminal according to an exemplary embodiment of the present invention.

Exemplary embodiments of the present invention are described with reference to the accompanying drawings in detail. The same reference numbers are used throughout the drawings to refer to the same or like parts. Detailed descriptions of well-known functions and structures incorporated herein may be omitted to avoid obscuring appreciation of the subject matter of the present invention by a person of ordinary skill in the art.

The present invention relates to a method and apparatus for controlling an operation of a portable terminal. In particular, a portable terminal according to an exemplary embodiment of the present invention recognizes a user's gesture inputted on a touch screen or a touch pad in a locking mode of the portable terminal. In addition, the present invention provides a method and apparatus for unlocking a locking mode of the portable terminal using a user's gesture which is recognized in the locking mode, and for entering a corresponding function which is mapped in advance that corresponds to the gesture when the locking mode is unlocked. The gesture represents a user's input operation which is performed according to a preset specific pattern (shape of a figure such as a character and a number or the like).

According to an exemplary embodiment of the present invention, the portable terminal provides an unlocking object for unlocking a locking mode according to user's setting in the locking mode of a portable terminal. The unlocking object includes gesture information (e.g., information of the shape of a figure such as a character and a number or the like) which guides operation for unlocking a locking mode, and function information (e.g., dialing information, application information) for a function that is expected to be promptly entered according to a corresponding gesture in case the locking mode is normally unlocked by the corresponding gesture. For example, such an unlocking object may be screen data that is provided through an idle screen when the portable terminal is in the locking mode. Hence, a user can intuitively recognize a gesture for unlocking the locking mode and a function that is executed according to a gesture input.

In addition, according to an exemplary embodiment of the present invention, in a locking mode of a portable terminal, the display of the unlocking object for unlocking the locking mode can be omitted according to a user setting. Hence, the present invention can be utilized as a password function for protecting user's privacy along with an unlocking function of a locking mode according to a user's gesture. Such an unlocking object and the setting according to the display of the unlocking object can be defined in advance or can be set by user.

Further, according to an exemplary embodiment of the present invention, if a locking mode of a portable terminal is in an activated state, locking information, which can be intuitively recognized by user for the locking mode, can be displayed on an idle screen. The locking information preferably includes an image and a text or the like that is displayed in the form of an icon, by which a user can easily identify the locking state of the portable terminal. For example, a text that informs that a locking mode is set and a lock-shaped icon can be provided in one area of an idle screen.

Hereinafter, in a portable terminal having a touch screen according to an exemplary embodiment of the present invention, a method of controlling an operation of a portable terminal based on a user's gesture will be discussed. However, the portable terminal of the present invention is not limited to the following description, and the present invention can be applied to a plurality of applications based on the following exemplary embodiments.

FIG. 1 is a flowchart illustrating exemplary operation of a method of unlocking a locking mode of a portable terminal according to an exemplary embodiment of the present invention.

More particularly, FIG. 1 illustrates the above-mentioned scenario where the display of an unlocking object is omitted when a portable terminal that is in both an idle state and a locking (locked) state (a touch screen hold state). However, the unlocking object can be displayed on the idle screen according to user's setting.

Referring now to FIG. 1, first, at (S101) a portable terminal in an idle mode then senses a specific input from the outside (S103), and at (S105) checks a locking state of an input device. That is, the portable terminal is able to check whether the locking mode is set when sensing an input from the outside. In an exemplary embodiment of the present invention, the input device may represent an input means such as a touch screen and a touch pad, and hereinafter, it is assumed for the purposes of explanation that the input device is a touch screen. At this time, if the portable terminal senses a specific input through the touch screen or the touch pad, the portable terminal can further perform the operation of turning a liquid crystal display (LCD) on. The artisan also understands and appreciates that any other type of thin-film screen technology compatible with touch can be used.

At (S107), if the portable terminal is not in a locking state, i.e., in an unlocking state, the portable terminal performs a corresponding operation. For example, it is possible to perform a corresponding operation such as displaying an idle screen or entering the initial menu according to the specific input.

On the other hand, if the portable terminal is in a locking state, the portable terminal preferably displays locking information/status by which a user can intuitively recognize that the portable terminal is in the locking state, and at (S109) activates a gesture input mode. At this time, the process of displaying an unlocking object can be further performed according to user's setting at step S109. The gesture input mode represents a mode where only a user's gesture can be inputted through a touch screen in a locking mode of the portable terminal. In the gesture input mode, all inputs by user can be sensed as a gesture. That is, in the gesture input mode, a touch sensing as in a general idle screen exempting a gesture sensing typically is not performed.

At (S111), the portable terminal checks whether a touch has been inputted by user through a touch screen. At this time, if there is no touch input sensed, at (S113) the portable terminal can wait for a user's input for a preset amount of time. Thereafter, if there is no input from user for the preset amount of time, the portable terminal can turn off the display unit, and enter (or re-enter) the idle mode.

At (S115), if there is a touch input, the portable terminal determines whether the touch input is a gesture input having a specific pattern. At this time, at (S117) if it is determined that the touch input is not a gesture input, the portable terminal checks whether the touch input is an unlocking input. For example, the portable terminal checks whether the touch input is an unlocking input of a locking mode by a long press input of a specific area where locking information is displayed.

At a result of checking at step S117, in case the touch input is a long press input on a specific area where locking information is displayed, then at (S121) the portable terminal unlocks the locking mode, and outputs a preset initial screen (an idle screen or the like). On the other hand, in case the touch input is not a long press input on a specific area, at (S119) the portable terminal can perform a corresponding operation. For example, a pop-up window, which informs that a locking mode is being set, can be outputted, or a user's input can be disregarded.

Next, as a result of determination at step (S115), if it is determined that the touch input is a gesture input, then at (S123) the portable terminal analyzes the inputted gesture.

Then, at (S125) the portable terminal determines whether the gesture corresponds to a preset gesture. That is, the portable terminal compares gestures among predefined sets of gesture information in order to check whether there is a gesture that coincides with the analyzed gesture.

Next, as a result of determination at step S125, if there is no gesture that coincides with the analyzed gesture, then at (127) the portable terminal can perform a preset operation. For example, the portable terminal performs operations such as processing an error of a user's gesture, informing of a locking mode state and requesting a re-input of a gesture or the like. In addition, the portable terminal can perform a function that checks whether the inputted gesture is registered. In other words, an operation can be performed like outputting guidance information for checking whether to register a user's gesture in an unlocking object. At this time, when a gesture registration of user is requested, the portable terminal can perform an operation of mapping and registering a function corresponding to the inputted gesture. Here, when providing such guidance information, the locking mode can be automatically unlocked, and the portable terminal can further perform an operation for user authentication according to a setting method.

Next, as a result of determination at step S125, if there is a gesture that coincides with the analyzed gesture, at (S129) the portable terminal then extracts a corresponding function mapped to the user gesture. The corresponding function may comprise, for example, one of an idle screen entry function, a speed dial function and a specific application execution function corresponding to the gesture. An example of such an operation will be explained later.

Then, at (S131), the portable terminal unlocks the locking mode, executes the extracting function, and displays the result of the execution on the screen.

The aforementioned description of a control method of unlocking a locking mode according to a gesture input generated on a touch screen, and promptly executing a corresponding function mapped to the gesture when the locking mode is unlocked in a portable terminal according to an exemplary embodiment of the present invention will be followed hereinafter by a screen example of operations of unlocking a locking mode using a gesture of the present invention as considered in FIG. 1, and executing a function corresponding to the gesture when unlocking the locking mode will be considered. However, a person of ordinary skill in the art should understand and appreciate that the screen example of the presently claimed invention is not limited to the following description, and is applicable in a plurality of functions based on the following exemplary embodiment.

First, various setting operations for unlocking a locking mode of a portable terminal using a user's gesture in a portable terminal according to an exemplary embodiment of the present invention will now be considered with reference to FIGS. 2 to 7.

Figure 2:
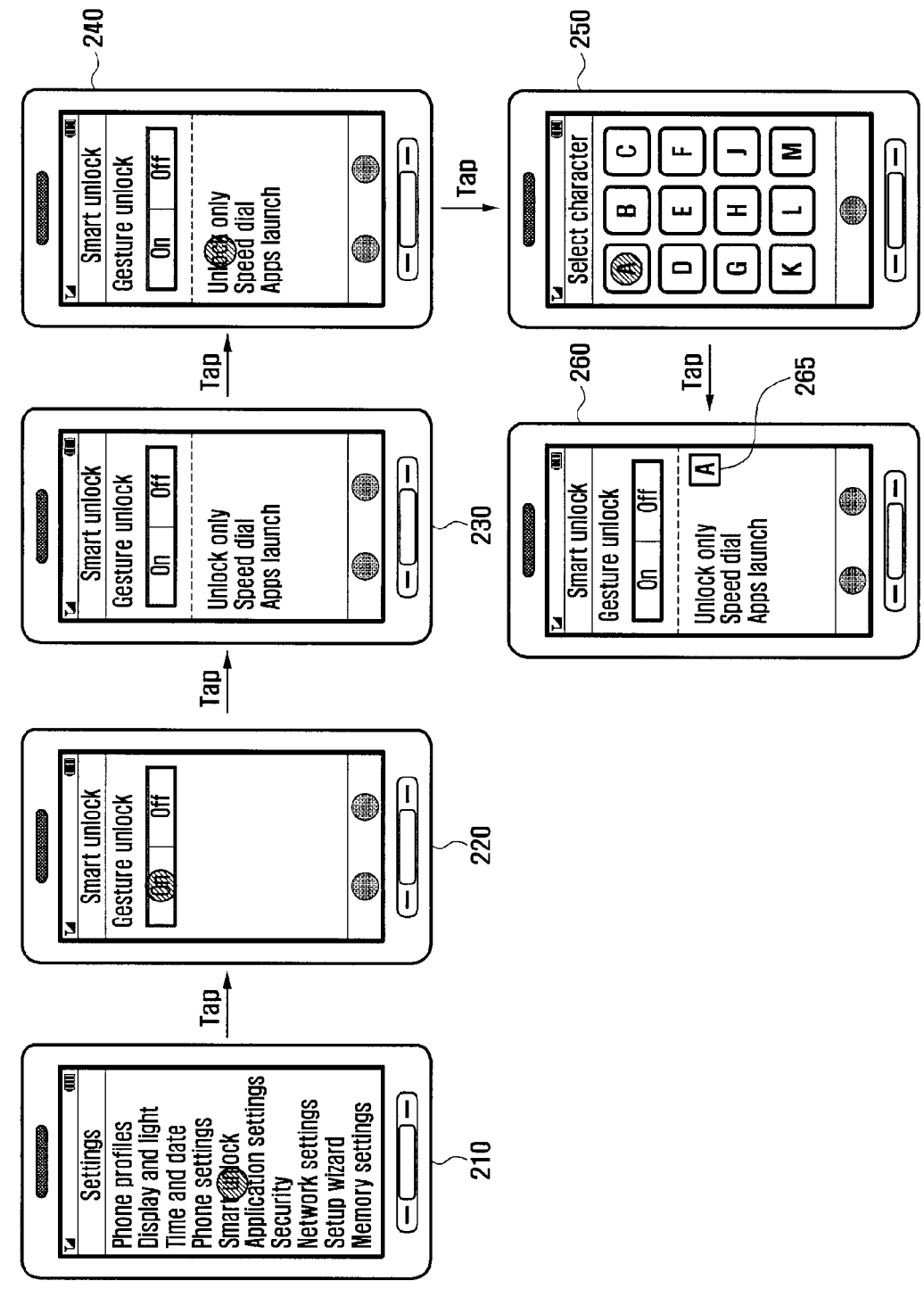
FIGS. 2 to 6 illustrate a screen of setting an unlocking object in a portable terminal according to an exemplary embodiment of the present invention.

FIG. 2 illustrates a series of screen displays for setting an unlocking object in a portable terminal according to an exemplary embodiment of the present invention.

Particularly, FIG. 2 illustrates an operation of a setting gesture information for only unlocking a locking mode without executing a previously-identified specific function while unlocking the locking mode.

Referring now to FIG. 2, as shown in display screen 210, a user can set a locking/unlocking function of a portable terminal through selecting an item related with a locking mode among various items of the setting menu provided in the portable terminal. For example, a user can activate a setting menu through entering a specific menu, and can enter a menu for setting a locking/unlocking function of a portable terminal by generating a tap event in "Smart unlock" among items of the setting menu. At this time, as shown in display screen 220 according to the user's tap event, the portable terminal can activate a menu for setting a locking/unlocking function of the portable terminal, and provide the activated menu. The display screen 220 shows an example of a setting screen which can determine whether a locking mode is unlocked by a user's gesture according to an exemplary embodiment of the present invention.

Next, in the state as shown in display screen 220, if user performs a selection for setting an unlocking function of a locking mode by a gesture, the portable terminal activates a menu for setting gesture information and function information and provides the activated menu as shown in display screen 230. At this time, user can set gesture information and function information by an item classification that is provided in advance. For example, as shown in display screen 230, the items displayed on display screen 230 can be classified into <Unlock only> item which can set an unlocking object (gesture information) for only unlocking a locking mode without performing a specific function, <Speed dial> item which can set an unlocking object (gesture information and function information (dialing information)) for performing a quick dialing according to function information (dialing information) that is mapped to a corresponding gesture along with the unlocking of the locking mode, and <Apps launch> item which can set an unlocking object (gesture information and function information (application information)) for a quick application execution according to function information (application information) that is mapped to a corresponding gesture along with the locking of the locking mode, and user can select his desired item, and set gesture information and function information according to the selected item.

Next, in the state as shown in display screen 230, user can generate a tap event in <Unlock only> item as shown in display screen 240. That is, when user inputs a gesture for unlocking a locking mode, it is possible to select a setting for only unlocking a locking mode without performing a separate function. Then, as shown in display screen 250, the portable terminal can provide a setting screen for registering gesture information display screen. The display screen 250 represents an example of a specific pattern corresponding to a gesture that can be inputted by user. The specific pattern can be provided in the form of a character, a number and a symbol. The character can be divided into mother tongues (Korean, English and French or the like) of each country. Hereinafter, the character, the number and the symbol will be expressed by the expression "figure" as a representative term. In addition, hereinafter, the case of using English alphabet characters as the "figure" will be explained as a representative example. However, the "figure" can be expressed by the mother tongue of each country, numbers and various symbols. In addition, in display screen 250, "A" to "M" are displayed, but "A" to "Z", which correspond to the actual English alphabets, are provided, and the other alphabets, which are not shown in display screen 250, can be displayed by a scrolling function, and can be selected.

Next, with continued reference to display screen 250 shown in FIG. 2, it is assumed that user selects figure "A" as a gesture for unlocking a locking mode display screen. That is, as shown in display screen 250, a user can generate a tap event on an area where figure "A" is located. Then, the portable terminal determines that gesture information setting is determined according to the user's tap event, and sets the figure "A" as gesture information that only unlocks the locking mode. Thereafter, the portable terminal can terminate the operation of setting gesture information, and provide the previous menu as shown in display screen 260.

At this time, according to gesture information setting for <Unlock only> item in display screen 230 to 250, an item 265 (shown in display screen 260), which intuitively indicates that gesture information is set in one area (e.g., a right area) of <Unlock only> item, is provided. FIG. 2 illustrates a particular example where an item corresponding to figure "A", which is gesture information that is set in the above process, is provided. However, such an item can be provided in various forms depending on the setting method.

Hereinafter, an operation of setting gesture information for unlocking a locking mode and a function to be performed according to corresponding gesture information when the locking mode is unlocked will be illustrated in accordance with FIG. 3.

Figure 3:
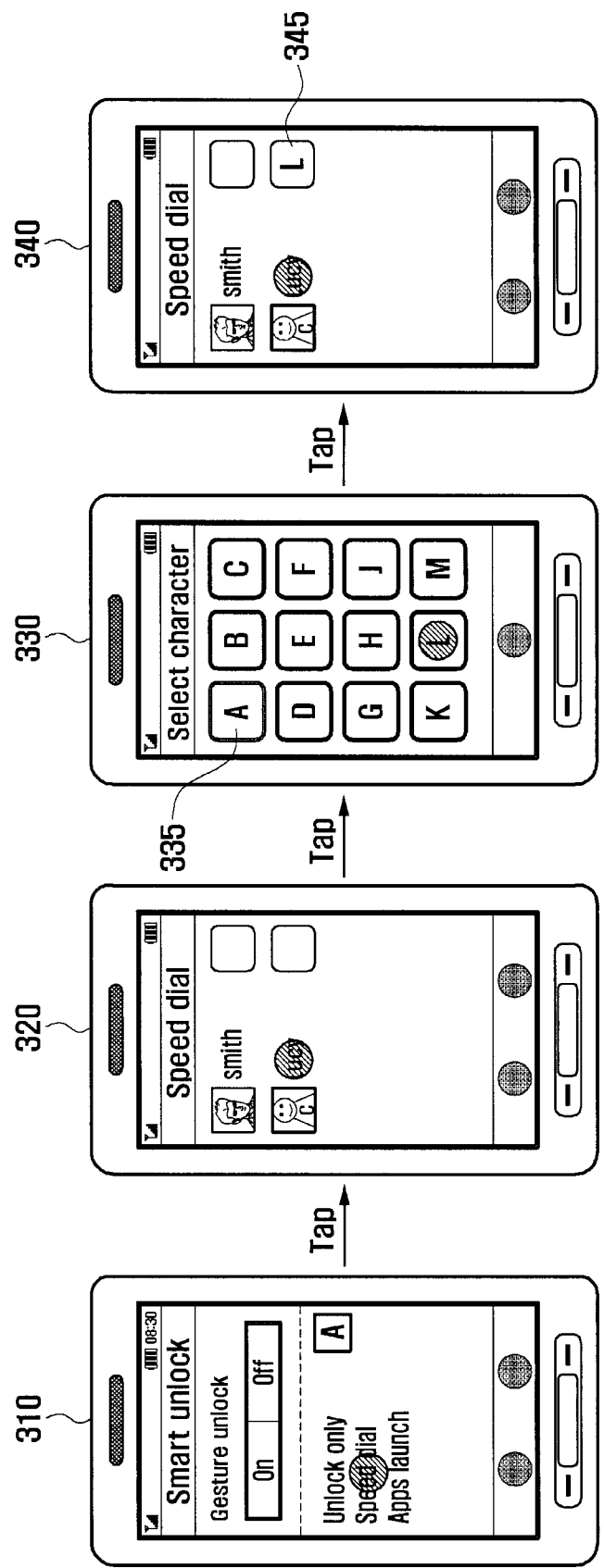

FIG. 3 illustrates another screen of setting an unlocking object in a portable terminal according to an exemplary embodiment of the present invention.

Particularly, FIG. 3 illustrates a setting operation by which a speed dial function can be promptly performed when a locking mode is unlocked using a gesture according to the present invention. In FIG. 3, gesture information for unlocking a locking mode and function information (dialing information) for a speed dialing function when unlocking the locking mode can be set.

At this time, when explaining FIG. 3, it should be noted that detailed explanation on portions corresponding to operations which were explained with reference to FIG. 2 will be omitted here. For example, the process of display screens 210 to 230 of FIG. 2 may also be performed in FIG. 3.

Referring now to FIG. 3, in the state as in display screen 230 of FIG. 2, user can generate a tap event in <Speed dial> item as shown in display screen 310 of FIG. 3. That is, user can select a setting for promptly executing a speed dial function according to a corresponding gesture when a gesture for unlocking a locking mode is inputted.

Then, the portable terminal can provide function information which is registered in advance by the user as shown in display screen 320. The function information of FIG. 3 may be, for example, dialing information that is registered in advance by user, and such dialing information may be information that is selectively designated by user among several sets of information (a phone number, a name and a nickname or the like) that are registered by a phonebook function. The display screen 320 illustrates a case where two sets of dialing information are stored in advance by the user.

At this time, in the present invention, the dialing information can be provided as dialing information that is designated by the user as described above, can be provided as the dialing information after extracting information of all users who are registered in a phone book when moving to display screen 320, or can be provided as the dialing information after extracting information of users of the list that is designated as a group (e.g., favorites or the like) by user.

Next, a user can select dialing information for promptly executing a speed dial function by a gesture in the example shown in display screen 320. Then, the portable terminal can provide a setting screen for registering gesture information to be mapped to the dialing information as shown in display screen 330. The display screen 330 illustrates a pattern of a specific pattern (figure) of a gesture that can be inputted by user, and the specific pattern corresponds to what was explained with reference to FIG. 2. At this time, as shown in item 335 of display screen 330, a specific figure, which was previously designated by user among various figures, can be provided in a manner that is distinguished from other figures. For example, the figure can be distinguished from other figures that were not designated before by highlighting or dimming an icon area (e.g., an area where figure "A" is located) where a corresponding figure is located.

Next, it is assumed that user selects figure "L" as a gesture for unlocking a locking mode and performing a speed dial function by dialing information selected in display screen 320 among the provided figures as in display screen 330. That is, as shown in the display screen 330, a user can generate a tap event on an area where figure "L" is located. Then, the portable terminal determines that the gesture information setting is determined according to the user's tap event. In addition, the portable terminal sets figure "L" as gesture information for unlocking a locking mode and performing a speed dialing function according to the set dialing information. Then, the portable terminal can terminate an operation of setting gesture information, and provide a previous menu as shown in display screen 340.

At this time, according to gesture information setting for specific dialing information <Lucy> item in <Speed dial> in the display screens 310 to 330, an item 345, which intuitively indicates that gesture information is set in one area (e.g., a right-side area) of <Lucy> item as shown in display screen 340, is provided. FIG. 3 illustrated a case where an item 345, which corresponds to "L" figure that is gesture information that is set in the above process, is provided. However, such an item can be provided in various forms depending on the setting method.

Figure 4:
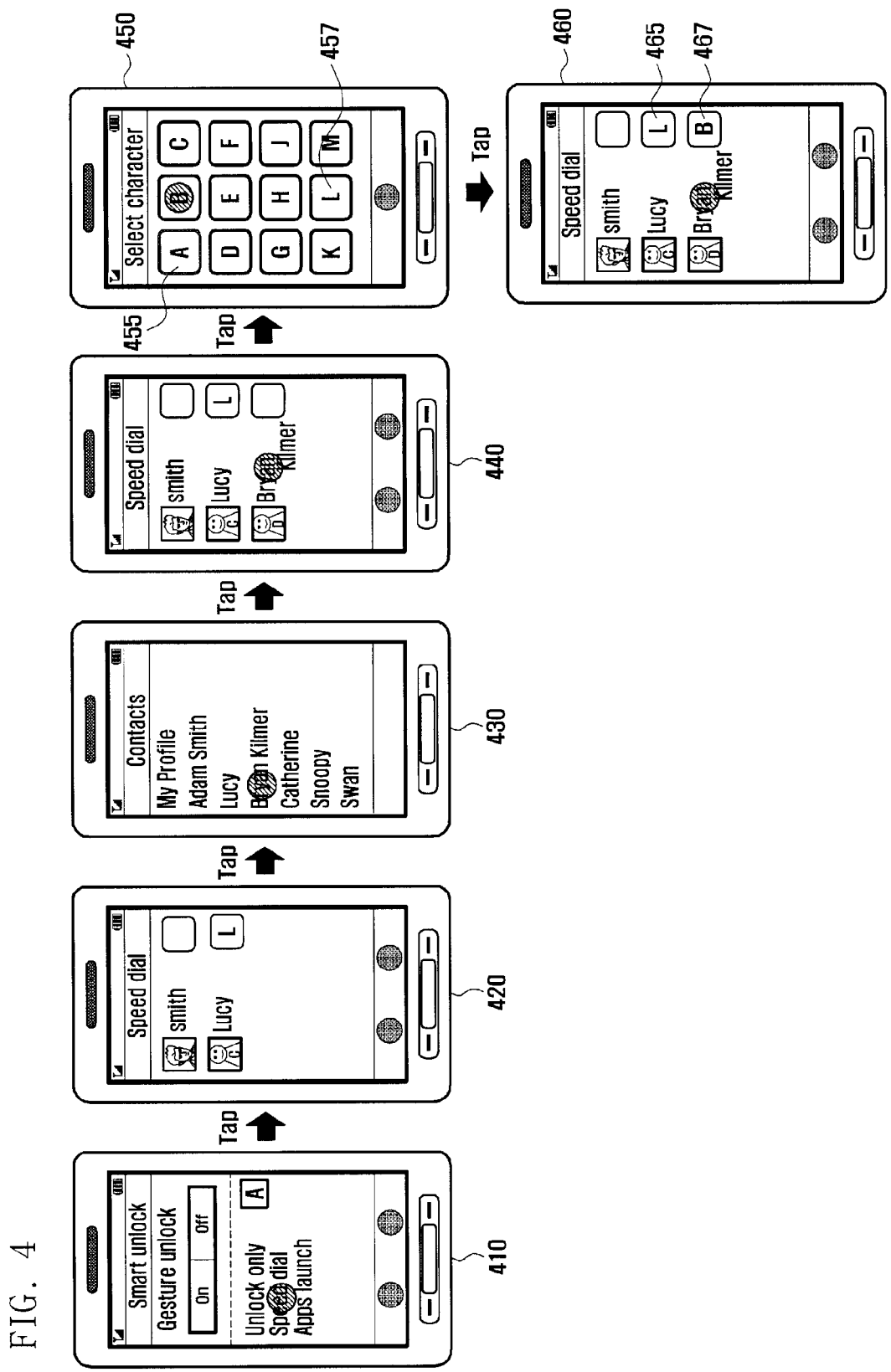

FIG. 4 illustrates a screen of additionally setting dialing information when setting the unlocking of a locking mode according to a speed dial function according to an exemplary embodiment of the present invention.

Referring now to FIG. 4, user can generate a tap event in <Speed dial> item as shown in display screen 410. That is, when user inputs a gesture for unlocking a locking mode, a setting for promptly executing a speed dialing function according to a corresponding gesture can be selected.

Then, the portable terminal can provide function information which is registered in advance by a user as shown in display screen 420. In FIG. 4, the function information may be dialing information that is registered in advance by user as explained in the description with reference to FIG. 3. In the display screen 420, a case where two sets of dialing information are stored in advance by user is illustrated.

At this time, in FIG. 3, as a setting for <Lucy> item is performed, an item, which intuitively indicates that gesture information is set in one area of the <Lucy> item as shown in the display screen 420, is provided.

Next, a user can further add new dialing information when his desire dialing information does not exist in a screen example of the display screen 420. To this end, a user can generate a tap event in a tap point, which can transmit a command for adding dialing information, for example, <Add> area, which is a tap point that is allocated an adding function. Then, the portable terminal can provide a list of a plurality of sets of user information which are registered in advance by a phonebook function as shown in display screen 430. A user can add new dialing information by selecting preset user information according to the user's desire from the list of user information sets.

That is, if a user's desired user information, e.g., <Bryan Kilmer> item, is selected from the provided list as in the display screen 430, the portable terminal enters a previous menu as shown in display screen 440, and provides a screen which adds the selected user information as dialing information.

Next, a user can select dialing information for a speed dial in a screen example of the display screen 440. Then, the portable terminal can provide a setting screen for registering gesture information to be mapped to the dialing information as shown in display screen 450. The display screen 450 indicates an example of a specific pattern (figure) of a gesture that can be inputted by a user as explained in the description with reference to FIG. 3. At this time, as shown in references 455 and 457, specific figures, which are designated in advance by user among the provided various figures, can be distinguished from other figures when the specific figures are provided. For example, the specific figures can be distinguished from the other figures, which are not designed in advance, when provided by highlighting or dimming an icon area (e.g., the area where figure "A" is located and the area where figure "L" is located) where a corresponding figure is located.

Next, it is assumed that a user selects figure "B" as a gesture for unlocking a locking mode and performing a speed dial function by dialing information selected in display screen 440 among figures provided as in the display screen 450. That is, as shown in the display screen 450, a user can generate a tap event in an area where figure "B" is located. Then the portable terminal determines that gesture information setting is determined according to the user's tap event. In addition, the portable terminal sets the figure "B" as gesture information for unlocking a locking mode and performing a speed dial function by the set dialing information. Then, the portable terminal can terminate the operation of setting gesture information, and provide the previous menu as shown in display screen 460.

At this time, one of items 465 and 467, which intuitively indicate that corresponding gesture information is set, is respectively provided in one area of dialing information <Bryan Kilmer> where gesture information is set in the above and in one area of dialing information <Lucy> item where gesture information is set in advance. Such an item 465, 467 can be provided in various forms depending on the setting method.

Figure 5:
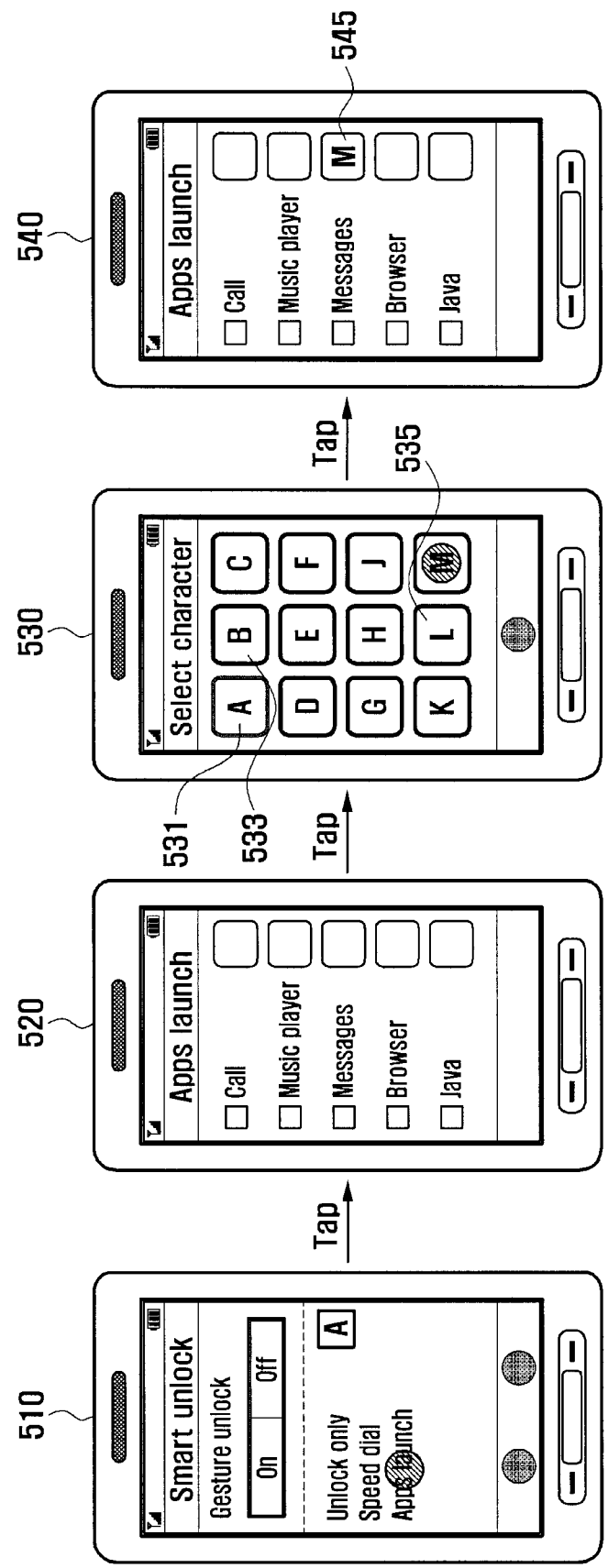

FIG. 5 illustrates another screen example of setting an unlocking object in a portable terminal according to an exemplary embodiment of the present invention. More particularly, FIG. 5 illustrates an operation of setting by which a specific application according to a corresponding gesture can be promptly executed when a locking mode is unlocked using a gesture. FIG. 5 can set gesture information for unlocking a locking mode and function information (application information) for a function of executing an application when the locking mode is unlocked.

Referring to FIG. 5, in the state as in display screen 230 of FIG. 2, user can generate a tap event in <Apps launch> item as shown in display screen 510 of FIG. 5. That is, when inputting a gesture for unlocking a locking mode, user can select a setting for promptly executing a specific application according to a corresponding gesture.

Then, the portable terminal can provide function information that is registered in advance by user as shown in display screen 520. In FIG. 5, the function information can be application information that is registered in advance by a user, and such application information may be at least one of various applications that the portable terminal supports. The display screen 520 illustrates a case where five sets of application information are stored in advance by a user.

Next, a user can select information of an application to be promptly executed when a locking mode is unlocked by a gesture in a screen example of the display screen 520. Then, the portable terminal can provide a setting screen for registering gesture information to be mapped to the application information as shown in display screen 530. The display screen 530 shows an example of a specific pattern (figure) of a gesture that can be inputted by a user. At this time, as shown in display screens 531 to 535, specific figures, which are designated before by user among the provided various figures, can be distinguished from other figures, and can be provided. For example, the specific figures can be distinguished from the other figures that have not been previously designated, and can be provided by highlighting or dimming an icon area (e.g., each area where figures "A", "B" and "L" are located) where a corresponding figure is located.

Next, it is assumed that a user selects a figure "M" as a gesture for unlocking a locking mode and promptly executing a corresponding application according to application information selected in display screen 520 among figures provided as in the display screen 530. That is, as shown in the display screen 530, a user can generate a tap event in an area where figure "M" is located. Then, the portable terminal determines that the setting of gesture information is determined according to the user's tap event. In addition, the portable terminal sets the figure "M" as gesture information for unlocking a locking mode and performing a direct application execution function by the preset application information. Then, the portable terminal can terminate an operation of setting gesture information, and can provide the previous menu as shown in display screen 540.

At this time, as shown in the display screen 540, an item 545 which intuitively indicates that corresponding gesture information is set is provided in one area of <Messages> item which is an application where gesture information is set. Such an item 545 can be provided in various forms depending on the setting method.

Further, FIGS. 3 to 5 illustrated a case where each set of function information for setting gesture information is designated in advance by a user. However, the operation of the present invention is not necessarily limited to this case, and when performing an operation of setting gesture information as mentioned above, all function information for each category provided from the portable terminal is provided, and an operation of selecting and setting function information according to a user's desire can be performed. Such an example is shown in FIG. 6.

Figure 6:
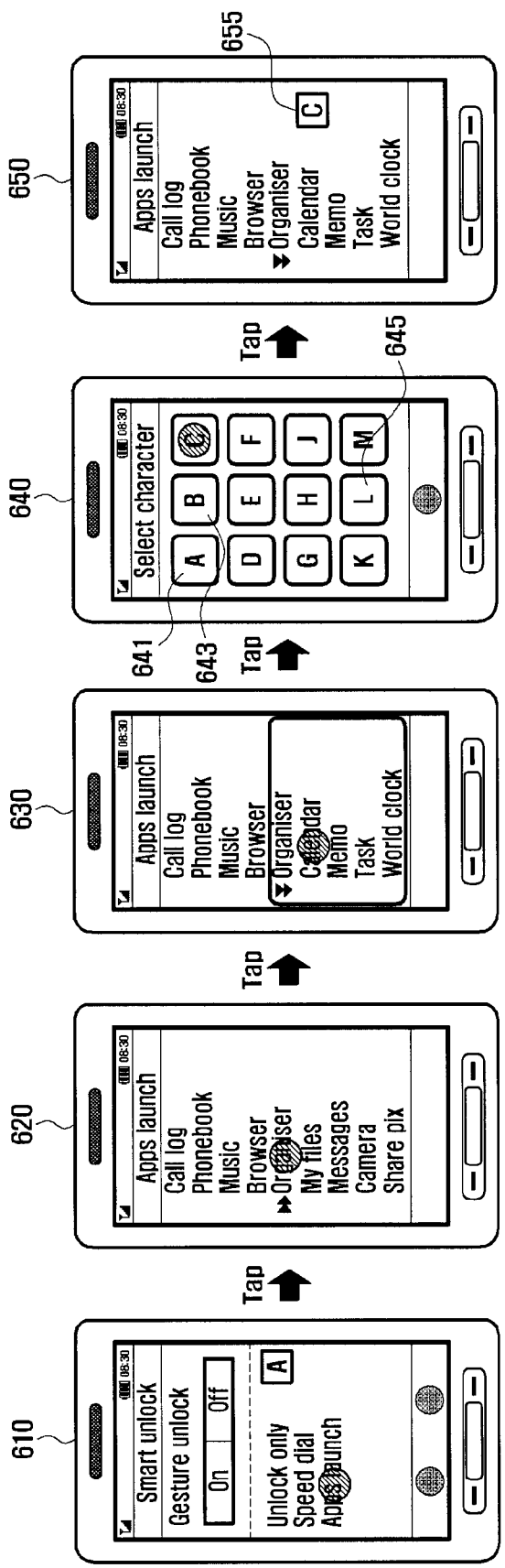

FIG. 6 illustrates another screen of setting an unlocking object of a portable terminal according to an exemplary embodiment of the present invention. More particularly, FIG. 6 illustrates an operation of selecting a specific application among all applications provided in a portable terminal according to a user's desire, and setting gesture information to the selected application. Such a setting operation of FIG. 6 can also be applied to an operation of setting dialing information for a speed dialing function.

Referring to FIG. 6, a user can generate a tap event in <Apps launch> item as shown in display screen 610. In other words, a user can select a setting for promptly executing a specific application according to a corresponding gesture when inputting a gesture for unlocking a locking mode. Then, the portable terminal can provide a list of applications provided in a portable terminal as shown in display screen 620.

Next, a user can select a specific application to be promptly executed when unlocking in a screen example of display screen 620. At this time, if a sub-item exists in a specific application selected by user, the portable terminal can move to the display screen 630, and if a sub-item does not exist in the selected specific application, the portable terminal can move to display screen 640. In FIG. 6, it is assumed that a sub-item exists in an initially selected application.

For example, in the display screen 620, if user selects <Organiser> item, the portable terminal determines whether a sub-item exists in the <Organiser>, and if a sub-item exists, the sub-item of the <Organiser> is provided as shown in display screen 630.

Next, a user can select an application to be promptly executed when unlocking a locking mode by a gesture in a screen example of the display screen 630.

Then, the portable terminal can provide a setting screen for registering gesture information to be mapped to the application as shown in display screen 640. The display screen 640 shows an example of a specific pattern (figure) of a gesture that can be inputted by user. At this time, as shown in display screens 641 to 645, specific figures, which are designated in advance by user among the provided various figures, can be distinguished from other figures, and can be provided. For example, the specific figures can be distinguished from the other figures that are not designated before, and can be provided by highlighting or dimming an icon area (e.g., each area where figures "A", "B" and "L" are located) where a corresponding figure is located.

Next, it is assumed that a user selects figure "C" as a gesture for unlocking a locking mode and promptly executing the above-selected application among figures provided as in the display screen 640. That is, as shown in the display screen 640, a user can generate a tap event in an area where figure "C" is located. Then, the portable terminal determines that the setting of gesture information is determined according to the user's tap event. In addition, the portable terminal sets the figure "C" as gesture information for unlocking a locking mode and promptly executing the set application. Then, the portable terminal can terminate the operation of setting gesture information, and provide the previous menu as shown in display screen 650.

At this time, as shown in the display screen 640, an item 655, which intuitively indicates that corresponding gesture information is set, is provided in one area of <Calendar> item which is a corresponding application where gesture information is set. Such an item 655 can be provided in various forms depending on the setting method.

Next, hereinafter, an operation of correcting (changing or initializing) the set gesture information is discussed herein. In addition, hereinafter, an operation in case gesture information used in the present invention is provided as characters, and the type of corresponding characters is changed into the mother tongue of each country is considered.

Figure 7:
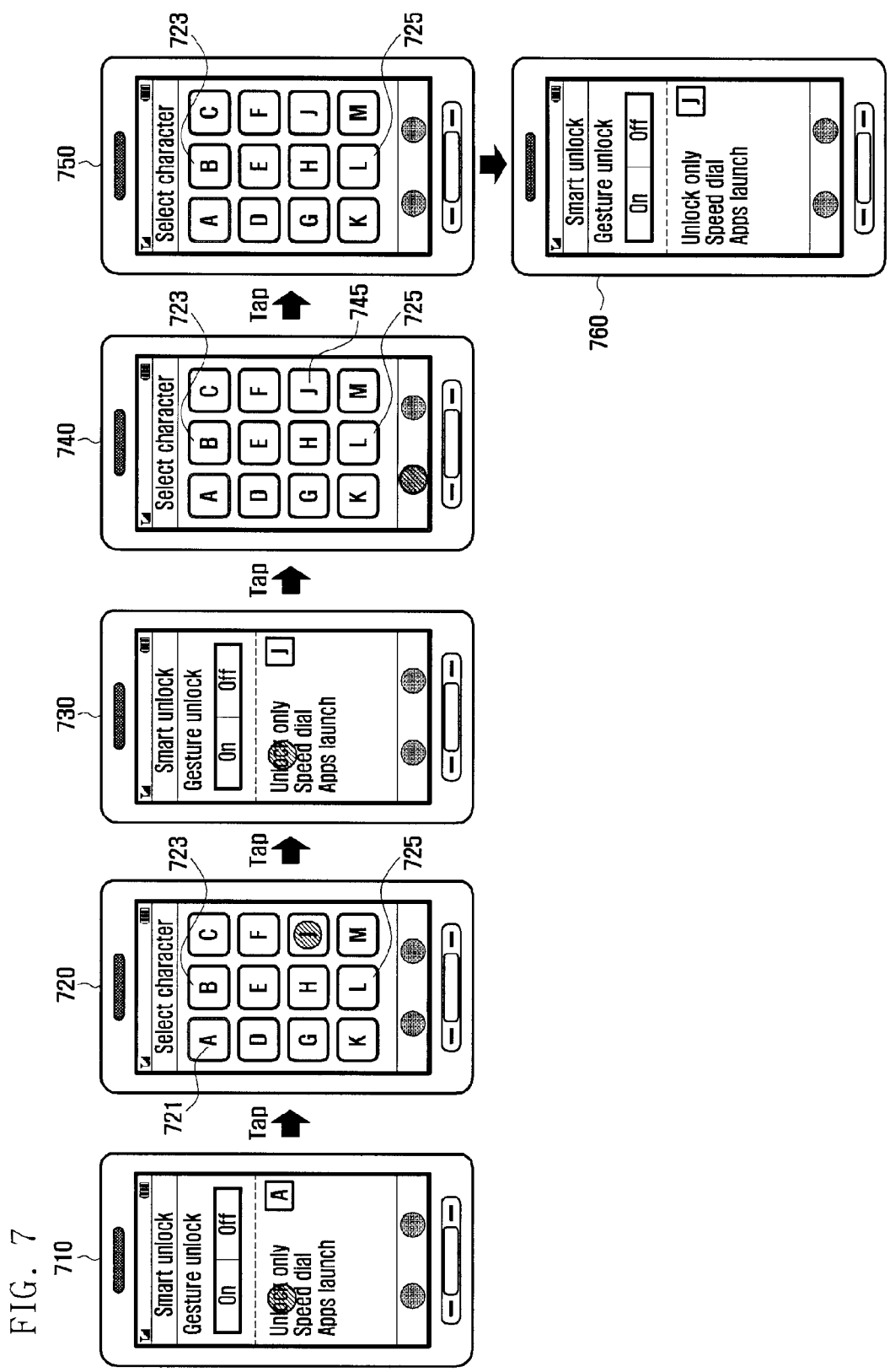
FIG. 7 illustrates an operation of correcting preset gesture information in a portable terminal according to an exemplary embodiment of the present invention.

FIG. 7 illustrates an operation of correcting the set gesture information in a portable terminal according to an exemplary embodiment of the present invention. Particularly, in FIG. 7, an example of an operation of correcting the gesture information which is set to only unlock a locking mode is explained among the exemplary embodiments explained with reference to FIGS. 2 to 6. Hence, such an operation of FIG. 7 can also be applied to an operation of correcting gesture information which is set to perform a speed dial function when unlocking a locking mode and gesture information which is set to perform an application when unlocking a locking mode.

Referring now to FIG. 7, a user can generate a tap event in <Unlock only> item in order correct gesture information which is set before for only unlocking a locking mode as shown in display screen 710. Then, the portable terminal can provide a screen of setting gesture information as shown in display screen 720. The display screen 720 indicates an example of a specific pattern corresponding to a gesture that can be inputted by a user. At this time, as shown in items 721 to 725, specific figures, which are designated in advance by a user among the provided various figures, can be distinguished from other figures, and can be provided. For example, the specific figures can be distinguished from the other figures, and can be provided by highlighting or dimming an icon area (e.g., each area where figures "A", "B" and "L" are located) where a corresponding figure is located).

Further, gesture information corresponding to figure "A" of the display screen 721 is gesture information which is set in the category which is currently entered by a user, i.e., <Unlock only>, and gesture information corresponding to each of figure "B" and figure "L" of the display screen 723 and the item 725 is gesture information which is set in the categories exempting the category which is currently entered by a user, i.e., <Speed dial> and <Apps launch>.

Hence, if a user requests a command for correcting the set gesture information, i.e., generates a tap event in an area where a new figure to be intended to be changed is located, the portable terminal determines the currently entered category, and extracts gesture information which is set within the corresponding category. In addition, the portable terminal changes the extracted gesture information into gesture information which corresponds to the figure of an area where the tap event is generated.

For example, it is assumed that a user changes figure "A", which is set as gesture information for only unlocking a locking mode, to figure "J" among figures provided as in the display screen 720. That is, as shown in the display screen 720, user can generate a tap event in an area where figure "J" is located instead of "A". Then, the portable terminal can determine whether preset gesture information for only unlocking a locking mode exists.

If preset gesture information does not exist, the portable terminal determines a corresponding figure, which is selected by a user, as gesture information as explained the description with reference to FIG. 2. On the other hand, if preset gesture information exists, the portable terminal removes previously set gesture information, and determines a corresponding figure, which is newly selected, as gesture information. That is, the portable terminal deactivates figure "A" corresponding to gesture information which is allocated before for only unlocking a locking mode, and newly allocates figure "J" as gesture information for only unlocking a locking mode.

Hence, the portable terminal sets figure "J" as gesture information for only unlocking a locking mode according to user's tap event in the display screen 720. Thereafter, the portable terminal can terminate an operation of setting the gesture information, and provide the previous menu as shown in display screen 730. At this time, referring to examples of the display screen 710 and the display screen 730, gesture information, which is provided in one area of <Unlock only> item, is changed from "A" to "J" and is then provided.

Further, in the display screens 710 to 730, an operation of correcting previously set gesture information into new gesture information was explained. Next, hereinafter, an operation of initializing set specific gesture information is described with reference to FIG. 7.

For example, a user can generate a tap event in <Unlock only> item in order to remove previously set gesture information which is set before for only unlocking a locking mode as shown in the display screen 730. Then, the portable terminal can provide a screen of setting gesture information as shown in display screen 740. The display screen 740 indicates an example of a specific pattern corresponding to a gesture that can be inputted by user as stated above.

At this time, as shown in display screens 723, 725 and 745, specific figures, which are designated in advance by a user among the provided various figures, can distinguished from other figures, and can be provided. For example, the specific figures can distinguished and provided by highlighting or dimming each area where gesture information that is set in the description with reference to FIGS. 3 to 7 is located, and figures "B", "L" and J" are located.

Here, gesture information corresponding to figure "J" of the display screen 745 is gesture information which is set in a category that is currently entered by a user, i.e., <Unlock only>, and gesture information corresponding to each of figure "B" and figure "L" of the display screen 723 and the display screen 725 is gesture information which is set in other categories exempting the category that is currently entered by user, that is, <Speed dial> and <Apps launch>.

Hence, if a user requests a command for initializing the set gesture information, that is, user generates a tap event in a tap point where a command for initializing the set gesture information is allocated, the portable terminal identifies the currently entered category, and extracts and removes the gesture information that is set in the category. That is, the gesture information which is set within the category is initialized.

For example, as in the display screens 730 and 740, in case user intends to remove gesture information which is allocated to a function of only unlocking a locking mode, user can enter the category (i.e., the <Unlock only>), and request a command for initializing the set gesture information as shown in the display screen 740. That is, a tap event can generate in a tap point where a command for initializing the set gesture information is allocated. Then, the portable terminal extracts gesture information which is set within the corresponding category, i.e., <Unlock only>, and removes the extracted gesture information. In addition, as shown in display screen 750, the portable terminal deactivates and provides figure "J" corresponding to gesture information which is allocated for only unlocking a locking mode.

Thereafter, the portable terminal can terminate an operation of setting the gesture information, and can provide the previous menu as shown in display screen 760. At this time, referring to the examples of the display screens 730 and 760, the indication of gesture information "J" item, which is provided in one area of <Unlock only> item, is omitted.

Further, until now, an operation of correcting the set gesture information has been considered with reference to FIG. 7. At this time, FIG. 7 illustrated an operation of correcting gesture information which is set for only unlocking a locking mode among exemplary embodiments explained with reference to FIGS. 2 to 6. Hence, such an operation example of FIG. 7 can also be applied to an operation of correcting gesture information which is set for performing a speed dialing function when a locking mode is unlocked or gesture information which is set for executing a corresponding application when a locking mode is unlocked.

Next, hereinafter, when a basic language setting of a portable terminal is changed in case a figure allocated as gesture information of the present invention is a character, a method of applying gesture information in response to such a change is considered. It is assumed here that the character is provided as a language for each country.

Figure 8:
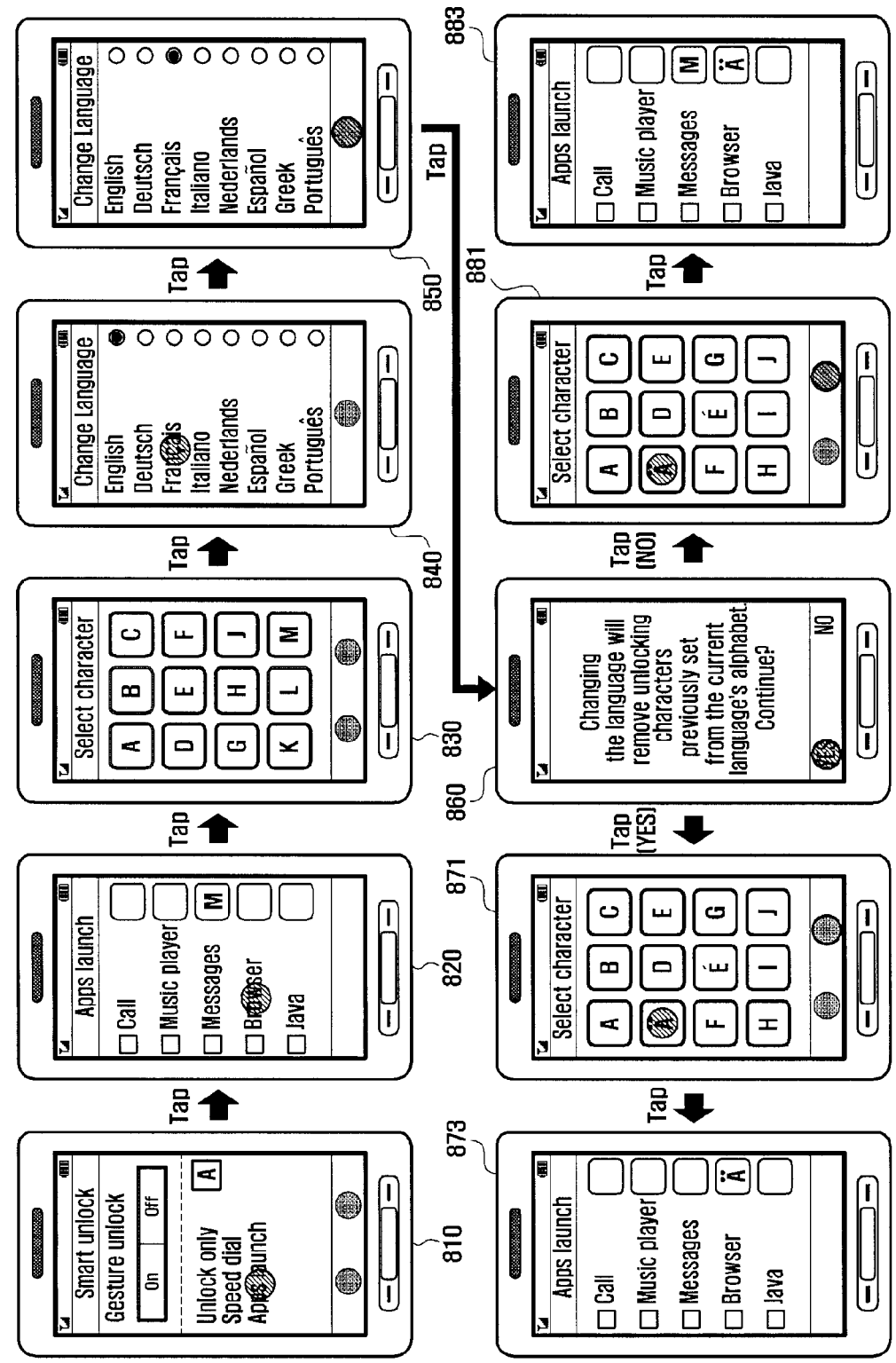
FIGS. 8 and 9 illustrate an operation of setting an unlocking object when language setting is changed in a portable terminal according to an exemplary embodiment of the present invention.

FIG. 8 illustrates an operation of setting an unlocking object according to a change in language setting in a portable terminal according to an exemplary embodiment of the present invention. Particularly, FIG. 8 illustrates a case where a language setting is changed among operations of setting an unlocking object.

Referring to FIG. 8, as shown in display screen 810, a user can generate a tap event in a category (e.g., <Apps launch> item) for setting an unlocking object. The portable terminal can provide function information which is registered in advance by user as shown in display screen 820. In FIG. 8, the function information may be application information corresponding to FIG. 5.

Next, user can select information of an application to be promptly executed when a locking mode is unlocked by a gesture in a screen example of the display screen 820. For example, a user can generate a tap event in <Browser> item as shown in the display screen 820 in order to promptly execute a browser function when a locking mode is unlocked. Then, the portable terminal can provide a setting screen for registering gesture information to be mapped to <Browser> that is selected by a user as shown in display screen 830. The display screen 830 shows a screen example of a case where an English character (alphabet) is used among specific patterns of gestures that can be inputted by user. At this time, specific English characters, which are designated in advance by a user among the provided English characters, can be distinguished from other English characters, and can be provided. For example, the specific characters can be distinguished from the other characters, which were not designated before, and can be provided by highlighting or dimming an icon area (e.g., each area where characters "A", "B" and "L" are located) where a corresponding English character is located.

Next, in the state as in the display screen 830, a user can change the English character to another character according to his desire. For example, a user can request a command for changing a character to be used as gesture information. That is, a user can generate a tap event in a tap point where a command for changing a character is allocated. Then, the portable terminal provides a list of character types that are provided in a portable terminal as shown in display screen 840. The list of the character types can be provided in various forms such as characters for each country, numbers and symbols or the like. In FIG. 8, it is assumed that characters for each country are used.

Next, user can select a language of a country to be changed from the provided list as in the display screen 840. FIG. 8 explains a case where the currently-provided language type is English characters, and the English characters are changed to French characters. Hence, a user can generate a tap event in <Francais> item in the display screen 840. Then, the portable terminal intuitively provides a visual item which informs of the change as shown in display screen 850 so that a user can recognize that the character type changed according to the tap event is French.

Next, a user can select changing the current English character type to a French character type as described above, and can input a command that determines such a change. Such an input can be performed through generation of a tap event in a tap point where a command for changing a character type is allocated. Then, the portable terminal can check whether previously-set gesture information exists in response to the character change request. At this time, if the set gesture information exists, the portable terminal can check whether the above-mentioned gesture information was initialized as shown in display screen 860.

Next, if the portable terminal senses an initialization request from a user as a result of checking whether the gesture information was initialized, the portable terminal can provide a setting screen for registering gesture information to be mapped to <Browser> that is selected by user as shown in display screen 871. At this time, the display screen 871 indicates a screen example of a case where French characters are used among specific patterns of a gesture that can be inputted by a user. That is, the display screen 830 indicated a screen example of a case where English characters are used, but in the display screen 871, the user's language is changed through the display screens 840 to 860, and French characters are provided. At this time, in the display screens 871 to 873, it is assumed that there is no gesture information which is set in advance by the French characters.

Next, it is assumed that a user selects figure "Ä" as a gesture for unlocking a locking mode and promptly executing a corresponding application <Browser> selected in display screen 820. That is, as shown in the display screen 871, a user can generate a tap event in an area where figure "Ä" is located. Then, the portable terminal determines that gesture information setting is determined according the user's tap event. In addition, the portable terminal sets the figure "Ä" as gesture information for unlocking the locking mode and performing a prompt execution function of an application according to the set application information.

Thereafter, the portable terminal can terminate an operation of setting gesture information, and provide the previous menu as shown in display screen 873. At this time, in the display screen 873, an item, which is provided in one area of <Messages> item as shown in display screen 820, is omitted in response to the initialization request of gesture information which is set in advance by user using English characters in the display screen 860.

Next, if the portable terminal senses an initialization cancellation request from a user as a result of checking whether the gesture information was initialized, the portable terminal can provide a list of character types which can set a new character type as shown in the display screen 850.

Alternatively, if the portable terminal senses an initialization cancellation request, the portable terminal can provide a screen for setting gesture information for promptly executing corresponding application <Browser> selected in the display screen 820 as the changed French characters in the state the previously-set gesture information is kept as shown in display screens 881 to 883.

In the latter case according to the initialization cancellation request, if the portable terminal senses an initialization cancellation request from a user, the portable terminal can provide a setting screen for registering gesture information to be mapped to <Browser> that is selected by user as shown in display screen 881. At this time, the display screen 881 indicates a screen example of a case where French characters are used among specific patterns of a gesture that can be inputted by a user. That is, the display screen 830 indicated a screen example of a case where English characters are used, but in the display screen 881, French characters are provided according to a change of the user's language through the display screens 840 to 860. At this time, in the display screens 881 to 883, it can be assumed that there is no gesture information which is previously set by the French characters.

Next, it is assumed that user selects figure "Ä" as a gesture for unlocking a locking mode and promptly executing corresponding application <Browser> selected in display screen 820 among French characters provided as in the display screen 871. That is, as shown in the display screen 881, user can generate a tap event in an area where figure "Ä" is located. Then, the portable terminal determines that gesture information setting is determined according to the user's tap event. In addition, the portable terminal sets the figure "Ä" as gesture information for unlocking a locking mode and performing prompt execution function of an application by the set application information.

Thereafter, the portable terminal can terminate an operation of setting gesture information, and can provide the previous menu as shown in display screen 883. At this time, in response to the initialization cancellation request of gesture information which is set in advance by a user using English characters in the display screen 860, an item, which is provided to one area of <Messages> item as shown in display screen 820, is kept as it is in the display screen 883. That is, according to an exemplary embodiment of the present invention, gesture information which is set for each language mode can be kept.

Figure 9:
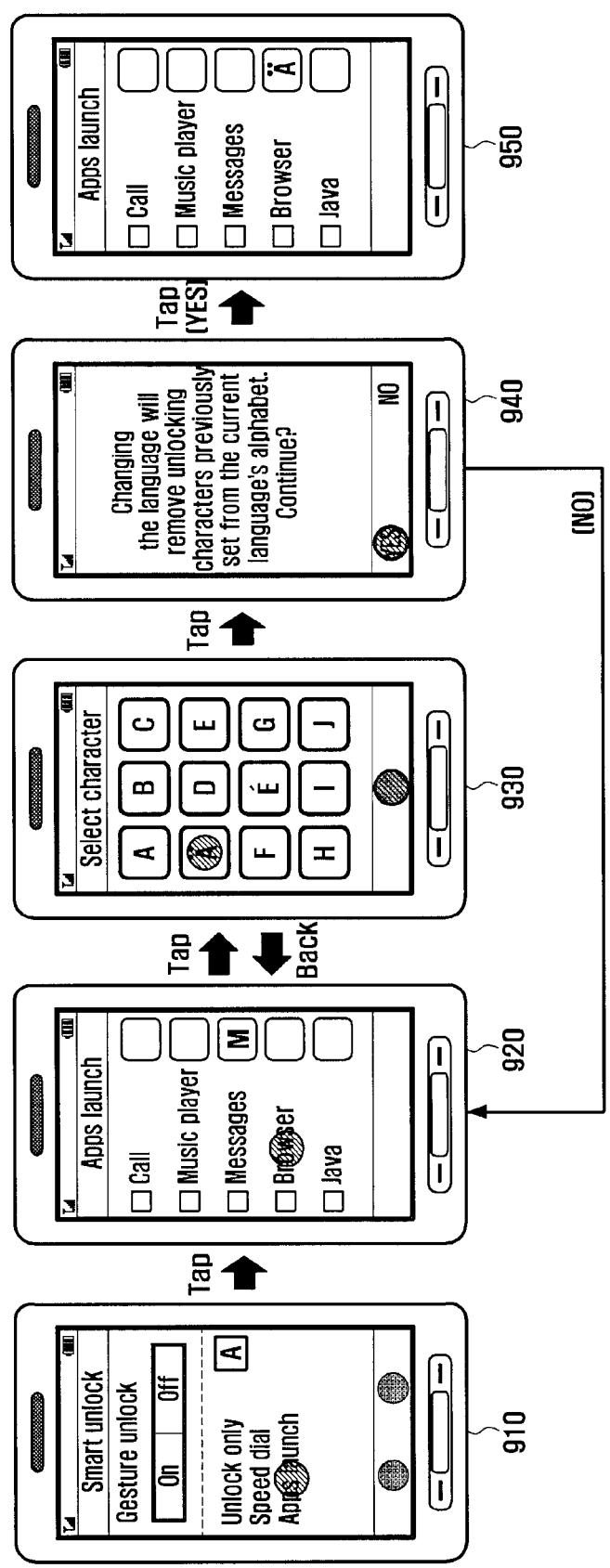

FIG. 9 shows another example of setting an unlocking object depending on a change of language setting in a portable terminal according to an exemplary embodiment of the present invention.

Particularly, FIG. 9 illustrates an operation of providing a character type for setting gesture information in case an unlocking object is provided after changing the basic language setting of a portable terminal. That is, FIG. 9 illustrates an operation in case a language, which is basically used by a user in a portable terminal, is changed from English to French, and user activates a setting menu for setting an unlocking object for the first time after changing the language.

Referring to FIG. 9, as shown in display screen 910, user can generate a tap event in a category (e.g., <Apps launch> item) for setting an unlocking object. Then, the portable terminal can provide function information that is registered in advance by user as shown in display screen 920. In FIG. 9, the function information may be application information corresponding to FIG. 5.

Next, a user can select application information to be promptly executed when unlocking a locking mode according to a gesture in a screen example of the display screen 920. For example, a user can generate a tap event in <Browser> item as shown in the display screen 920 in order to promptly perform Browser function when unlocking a locking mode. Then, the portable terminal can provide a setting screen for registering gesture information to be mapped to <Browser> that is selected by a user as shown in display screen 930. The display screen 930 illustrates a screen in case French characters are used among specific patterns of a gesture that can be inputted by a user. Particularly, the display screen 930 illustrates a screen that is provided as the language setting provided by a user in a portable terminal from English characters to French characters as stated above.

Next, it is assumed that user selects figure "Ä" as a gesture for unlocking a locking mode and promptly executing corresponding application <Browser> which is selected in display screen 920 among French characters provided as in the display screen 930. That is, as shown in the display screen 930, a user can generate a tap event in an area where figure "Ä" is located. Then, the portable terminal determines that gesture information setting is determined according to a user's tap event.

At this time, the portable terminal can recognize whether basic language setting was changed before setting an unlocking object as mentioned above. That is, the portable terminal determines whether or not the basic language setting was changed before requesting setting of the gesture information as explained above. In addition, the portable terminal checks whether gesture information, which was set before by English characters, is initialized as shown in display screen 940 in case the basic language setting is changed.

Next, if the portable terminal senses an initialization request from a user as a result of checking whether the gesture information was initialized, the portable terminal initializes gesture information which is set in advance by English characters. In addition, the portable terminal sets the figure "Ä" as gesture information for unlocking a locking mode and performing prompt execution function of application <Browser>.

Thereafter, the portable terminal can terminate an operation of setting gesture information, and provide the previous menu as shown in display screen 940. At this time, in response to an initialization request of gesture information which is set in advance by a user using English characters in the display screen 950, an item, which is provided in one area of <Messages> item as shown in the display screen 920, is omitted in the display screen 950.

Next, if the portable terminal senses an initialization cancellation request from a user as a result of checking whether the gesture information was initialized, the portable terminal can move to the step of the display screen 920 according to a user's setting method, and may cancel the gesture information setting process which is requested by user. Or, the portable terminal can also perform an operation of mapping a corresponding application to the newly-set French character in the state where the gesture information which is set using the previous English character is kept as explained in the description with reference to FIG. 8 as described above according to user's setting method.

Hereinafter, an operation of unlocking a locking mode using gesture information according to the set unlocking object as the above, and executing function information corresponding to the gesture information when the locking mode is unlocked will be considered.

Before considering an example of executing operation of the present invention, an example of an unlocking object of the present invention, which is set as described above, is described in the following Table 1.

TABLE 1

| | Function information | | |
|---|---|---|---|
| Gesture info. | Function info 1 | Function. info 2 | Remarks |
| A | Unlock only | | Unlocking locking mode and idle screen |
| L | Speed dial | Lucy | Unlocking locking mode and dialing by Lucy's phone number |
| M | Apps launch | Messages | Unlocking locking mode and executing message-writing function |
| ... | | | |

Table 1 shows an unlocking object defined by a user, and a user can unlock a locking mode of a portable terminal through inputting a gesture corresponding to one of the figures "A", "L" and "M" corresponding to gesture information. Moreover, when unlocking a locking mode according to a gesture input, a function corresponding to function information mapped to corresponding gesture information can be promptly executed. The mapping of such gesture information and function information is not limited to the example of Table 1. Hence, the mapping between gesture information and function information can be done according to a user's setting (editing/adding/removing), or such setting information can be downloaded from a related server (e.g., a server of a manufacturer) which provides such setting information.

In addition, a function, which is expected to be promptly entered when the locking mode is normally unlocked, is not limited to setting one set of function information in one set of gesture information as in Table 1, and it is possible for two or more sets of function information to be set in one set of gesture information. For example, in an example of Table 1, the message and camera function can be mapped to figure "M". In such a case, at least two functions can be executed at the same time according to one gesture. In the above example, the portable terminal can unlock a locking mode according to a gesture corresponding to the figure "M" of a user, and can execute the message function and the camera function, respectively, when unlocking a locking mode.

At this time, the priorities of executing each function can be determined according to a user's setting and a predefined method when a portable terminal is manufactured. For example, each screen data according to simultaneous execution of the message function and the camera function can be simultaneously provided on a screen according to a preset arrangement method (screen division arrangement/overlap arrangement/vertical arrangement/horizontal arrangement).

Alternatively, the message and camera functions can be executed at the same time, but in case of screen data provided on the screen, screen data of the high priority function are provided, and the screen data of the remaining other functions can be processed as the background by a multi-tasking function. At this time, user can perform a conversion between functions by the multitasking.

In addition, according to an exemplary embodiment of the present invention, it is possible for two or more sets of gesture information to be set in one set of function information. For example, it is possible for each set of gesture information corresponding to the language of each country to be set in one set of function information. Such an example is shown in the following Table 2.

TABLE 2

| Gesture info. | Function information | | Remarks |
|---|---|---|---|
| | Function info 1 | Function. info 2 | |
| A | Unlock only | | Unlocking locking mode and idle screen |
| L | Speed dial | Lucy | Unlocking locking mode and dialing by Lucy's phone number |
| M | Apps launch | Messages | Unlocking locking mode and executing message-writing function |
| D | Apps launch | Browser | Unlocking locking mode and executing browser function |
| Ä | Apps launch | Browser | Unlocking locking mode and executing browser function |
| ... | | | |

As shown in Table 2, English character "D" and French character "Ä" can be respectively set as gesture information which can promptly execute a browser function. In such a case, a user can unlock a locking mode and promptly execute a browser function when unlocking the locking mode using one gesture among "D" and "Ä".

Further, though omitted in Table 1 and Table 2, it can be set whether the unlocking object of the present invention, which is set as the above, will be displayed in the locking mode. At this time, it is possible to set whether the entire unlocking object will be displayed, or to set only to display specific items among examples, such as Table 1 and Table 2, according to a user's selection.

Hence, in case a user sets to display the entire unlocking object, the unlocking object can be displayed on an idle screen at the locking mode. In addition, in a case where the unlocking object is set to be entirely hidden, a function of unlocking a locking mode according to a gesture input is provided, but the display of the unlocking object on the idle screen at the locking mode can be omitted. In addition, if the unlocking object is set to be partly displayed, only a specific number of unlocking objects according to a user's designation among the entire preset unlocking objects can be displayed on the idle screen at the locking mode. Even in such a case, when a gesture which is not displayed is inputted, the locking mode can be unlocked, and the mapped corresponding function can be executed.

Then, hereinafter, an operation of unlocking a locking mode using gesture information "A", "L" and "M" as shown in Table 1, and executing function information corresponding to the gesture information when the locking mode is unlocked will be considered. At this time, in an exemplary embodiment of the present invention, a case where a portable terminal is a portable terminal having a full touch screen is illustrated. However, the present invention is not limited to the case where the portable terminal includes such a full touch screen, but can be applied to all types of portable terminals such as a folder type, a bar type and a slide type or the like including a touch screen. In addition, in the present invention, a gesture can be inputted not only through the touch screen, but also through the touch pad in a portable terminal having a touch pad.

Figure 10:
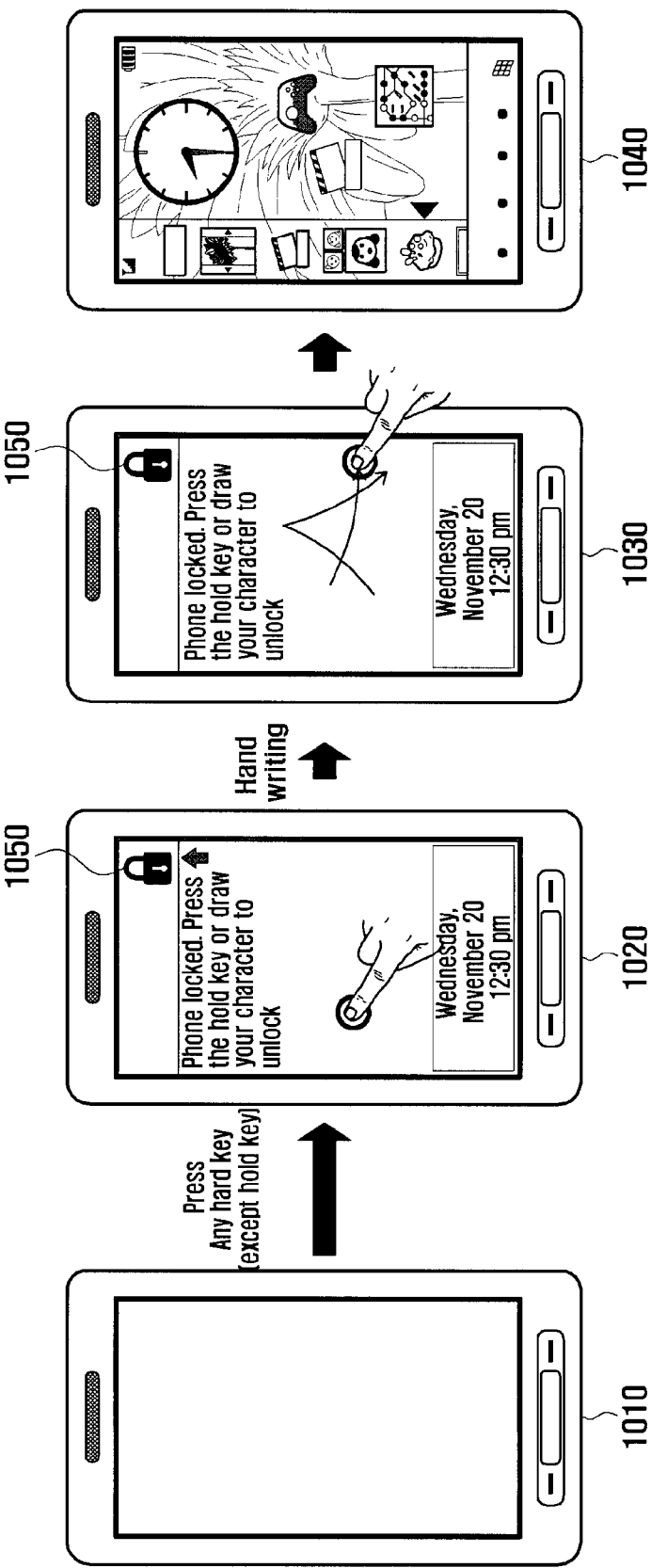
FIGS. 10 to 12 illustrate an operation of displaying screen data according to an input of a user's gesture according to an exemplary embodiment of the present invention.

FIG. 10 illustrates an operation of unlocking a locking mode and displaying screen data according to the unlocking of the locking mode depending on a user's gesture input in a portable terminal according to an exemplary embodiment of the present invention.

Referring to FIG. 10, first, as shown in display screen 1010, the display unit of a portable terminal can be in off state in an idle mode. At this time, when the portable terminal senses a specific input from the outside in an off-state of the display unit, the portable terminal can convert the state of the display unit into an on-state as shown in display screen 1020. The specific input may be an input generated on the display of the portable terminal, or may include an input like a function key for unlocking a locking mode.

At this time, the portable terminal can provide locking information 1050 in an input area as shown in display screen 1020. For example, locking information 1050, such as an icon in the form of a lock in a locked state, for example, can be provided in the input area, by which a user can intuitively recognize whether a portable terminal is in a locked state by the locking information 1050 icon. In addition, a user can lock the locking mode of the portable terminal through an input like a long press in the locking information 1050. The long press input indicates inputting for more than critical time according to a user's setting. When unlocking a locking mode by the long press input, function execution by the function information can be omitted.

Further, though omitted in FIG. 10, the portable terminal can display an unlocking object which is set by a user according to a setting method when the display unit is converted into an on state in the locking mode. The unlocking object includes at least one set of gesture information which can unlock a locking mode, and function information mapped to the gesture information. Hence, a user can intuitively recognize gesture information for unlocking a locking mode and execution function according to the input of the gesture.

Next, in the state as in the display screen 1020, a user can generate "A" shape gesture input on a touch screen as shown in display screen 1030. FIG. 10 illustrates a screen of unlocking a locking mode and executing a corresponding function according to an "A" shape gesture input among a user's gesture inputs. Hence, when a gesture corresponding to "A" shape is inputted, the locking mode is unlocked, and when the locking mode is unlocked, an idle screen, which is a function mapped to the "A" gesture, is executed, thereby displaying the screen data.

The portable terminal can sense, for example, the "A" gesture input by an algorithm like handwriting recognition. Then, the portable terminal can recognize that the "A" gesture input is for unlocking a locking mode and executing an idle screen, that is, for only unlocking the locking mode, as defined in Table 1. In addition, the portable terminal unlocks a locking mode according to the "A" gesture, executes an idle screen, which is a function corresponding to the "A" gesture, and outputs the screen data.

Figure 11:
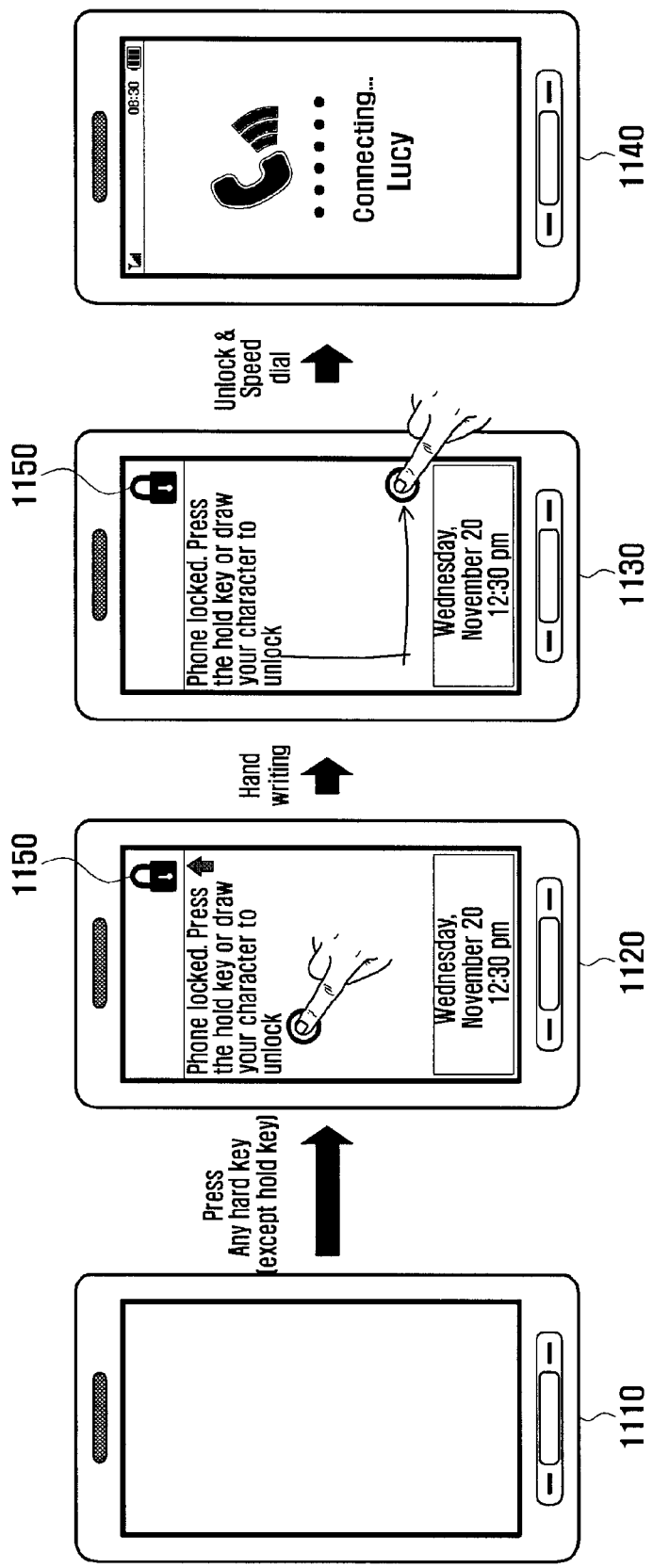

FIG. 11 illustrates an operation of unlocking a locking mode depending on user's gesture input and displaying screen data according to the unlocking of the locking mode in a portable terminal according to an exemplary embodiment of the present invention.

Referring to FIG. 11, first, as shown in display screen 1110, the display unit of a portable terminal can be in off state. At this time, when a specific input is sensed from the outside in the off state, the portable terminal converts the state of the display unit into the on state as shown in display screen 1120. In addition, the portable terminal can provide locking information 1150 according to the setting method as shown in the display screen 1120. The description on display screens 1110, 1120 and 1150 corresponds to the description with reference to display screens 1010, 1020 and 1050 of FIG. 10. Hence, the detailed description on display screens 1110, 1120 and 1150 will be omitted here.

Next, in the state as in the display screen 1120, a user can generate a "L" shape gesture input on a touch screen as shown in display screen 1130. FIG. 11 illustrates a screen of unlocking a locking mode and executing a corresponding function according to an "L" shape gesture input among a user's gesture inputs. Hence, when a gesture corresponding to "L" shape is inputted, the locking mode is unlocked, and when the locking mode is unlocked, dialing is executed according to function information mapped to the "L" gesture, thereby displaying the screen data.

The portable terminal can sense the "L" gesture input by an algorithm like a handwriting recognition. Then, the portable terminal can recognize that the "L" gesture input is for unlocking a locking mode and executing dialing according to dialing information mapped to the corresponding gesture information as defined in Table. In addition, the portable terminal unlocks a locking mode according to the "L" gesture, executes dialing according to dialing information, which is "Lucy" corresponding to the "L" gesture as shown in display screen 1140, and outputs screen data corresponding to the execution of dialing.

Figure 12:
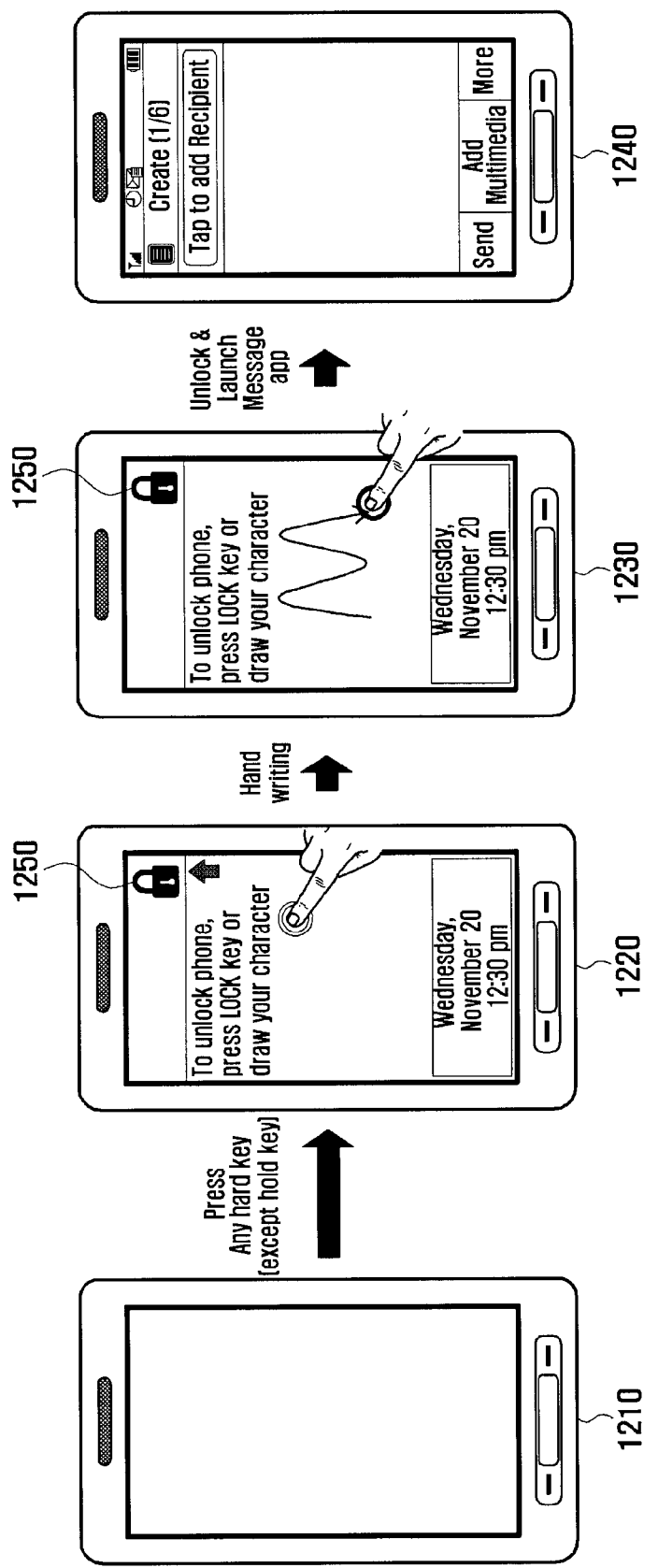

FIG. 12 illustrates an operation of unlocking a locking mode and displaying screen data according to the unlocking of the locking mode depending on a user's gesture input in a portable terminal according to an exemplary embodiment of the present invention.

Referring to FIG. 12, first, as shown in display screen 1210, the display unit of the portable terminal can be in the off state in an idle mode. At this time, when the portable terminal senses a specific input from the outside in the off state, the portable terminal converts the state of the display unit into on state as shown in display screen 1220. In addition, the portable terminal can provide locking information 1250 as shown in the display screen 1220 according to the setting method. The description on display screens 1210, 1220 and 1250 corresponds to the description with reference to references 1010, 1020 and 1050 of FIG. 10. Hence, the detailed description on display screens 1210, 1220 and 1250 will be omitted here.

Next, in the state as in the display screen 1220, a user can generate an "M" shape gesture input on a touch screen as shown in display screen 1230. FIG. 12 illustrates a screen of unlocking a locking mode and executing a corresponding function according to an "M" shape gesture input among user's gesture inputs. Hence, when a gesture corresponding to "M" shape is inputted, the locking mode is unlocked, and when the locking mode is unlocked, a message writing function is executed according to function information mapped to the "M" gesture, thereby displaying screen data according to the execution of the message writing function.

The portable terminal can sense the "M" gesture input by an algorithm like a handwriting recognition. Then, the portable terminal can recognize that the "M" gesture input is for unlocking a locking mode and executing a message writing function mapped to the corresponding gesture information as defined in Table 1. Then, the portable terminal unlocks a locking mode according to the "M" gesture, executes a message writing function corresponding to the "M" gesture as shown in display screen 1240, and displays screen data corresponding to the execution of the message writing function.

Further, as shown in FIGS. 10 to 12, it is possible to provide information for allowing user to recognize whether a gesture operation for unlocking a locking mode of a portable terminal is being normally performed. That is, the portable terminal can provide moving path information corresponding to a moved path (e.g., a touch and a drag) of a user's finger or a stylus according to user's gesture. For example, FIGS. 10 to 12 show a path according to the user's finger movement. However, the present invention is not limited to the example, and such moved path information may be displayed, or the display may be omitted according to user's setting.

Until now, a method of controlling the unlocking of a locking mode and the execution of a function corresponding to the gesture according to a user's gesture input in a portable terminal having a touch screen, and the screen examples have been explained with reference to FIGS. 1 to 12. Next, hereinafter, a portable terminal, which performs operations of the present invention as described in FIGS. 1 to 12, will be considered. However, the portable terminal of the present invention is not limited to the following description, and can be applied to various embodiments based on the following embodiment.

Before the detailed description on the portable terminal of the present invention, hereinafter, the portable terminal of the present invention will be explained as a mobile communication terminal. However, the present invention is not limited to the mobile communication terminal.

Hence, the portable terminal of the present invention can include all mobile communication terminals and all types of small devices having a touch screen or a touch pad, which are operated based on communication protocols corresponding to various communication systems. For example, the portable terminal of the present invention can include all information communication devices, multimedia devices and application devices thereof such as a portable multimedia player (PMP), a digital broadcasting player, a personal digital assistant (PDA), a portable game terminal, a music player (e.g., an MP3 player), and a smart phone or the like. In addition, a method of controlling the unlocking of a locking mode by a user's gesture input and execution of a function corresponding to the gesture can be applied to a medium or large size device such as a television (TV), a large format display (LFD), a digital signage (DS) a media pole, a personal computer and a notebook or the like.

Figure 13:
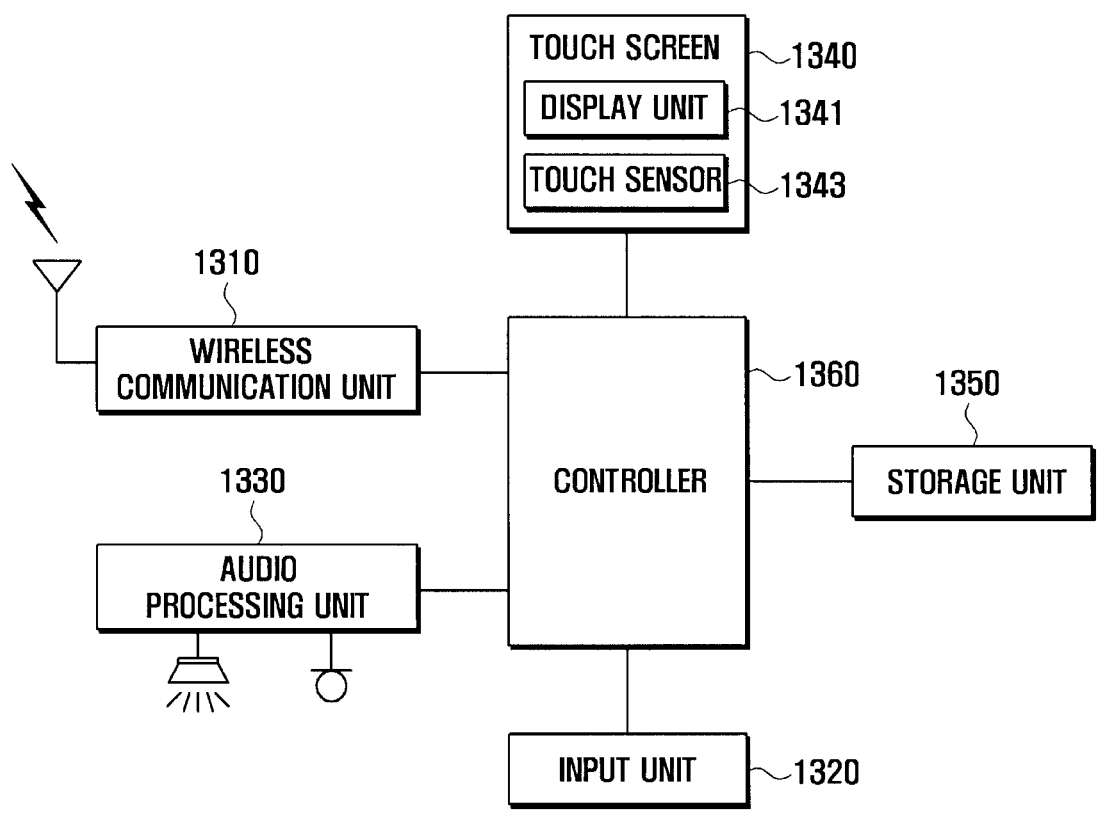
FIG. 13 schematically illustrates a configuration of a portable terminal according to an exemplary embodiment of the present invention.

FIG. 13 schematically illustrates a configuration of a portable terminal according to an exemplary embodiment of the present invention. Particularly, FIG. 13 illustrates a case where the portable terminal of the present invention is a mobile communication terminal, but the portable terminal of the present invention is not limited to a mobile communication terminal.

Moreover, FIG. 13 illustrates that a portable terminal of the present invention has a touch screen consisting of a touch sensor and a display unit as one device, but the present invention is not limited to this example. Hence, the portable terminal of the present invention may include a general display unit and a touch pad, which is an independent element that is separated from the display unit and receives an input of a user's gesture. That is, the touch sensor, which receives an input of a user's gesture in the present invention, may be one of a touch screen and a touch pad depending on the type of a portable terminal. Alternatively, if the portable terminal of the present invention includes both a touch screen and a touch pad, a user's gesture of the present invention may be inputted from at least one of the touch screen and the touch pad.

Referring to FIG. 13, a portable terminal according to an exemplary embodiment of the present invention preferably includes a wireless communication unit 1310, an input unit 1320, an audio processing unit 1330, a touch screen 1340, a storage unit 1350 and a controller 1360. The touch screen 1340 includes a display unit 1341 and a touch sensor 1343.

The wireless communication unit 1310 performs communication of the portable terminal. The wireless communication unit 1310 forms a communication channel with a mobile communication network that can be supported, and performs communication such as a voice call, video telephony call and data call. The wireless communication unit 1310 may include, for example, a radio frequency (RF) transmission unit which up-converts and amplifies the frequency of a transmitted signal and an RF reception unit which low-noise-amplifies a received signal and down-converts the frequency.

The input unit 1320 receives the input of various text information, and transmits signals inputted in association with the setting of various functions and the controlling of functions of the portable terminal to the controller 1360. The input unit 1320 generates an input signal according to user's action, may consist of at least one of a keypad and a touch pad. In an exemplary embodiment of the present invention, the input unit 1320 may be formed as a touch pad, and may receive an input of a user's gesture. In such a case, the configuration of the touch screen 1340 can be omitted, and the input unit 1320 may include a general display means. In addition, the input unit 1320 may be integrally formed with the touch screen 1340, and may perform both an input function and a display function at the same time. That is, in case a portable terminal of the present invention is operated by the touch screen 1340, the configuration of the input unit 1320 can be omitted.

The audio processing unit 1330 may be connected to a microphone (MIC) and a speaker (SPK). The audio processing unit 1330 converts voice signals inputted from the microphone into data and outputs the data to the controller 1360, and outputs voice signals inputted from the controller 1360 through the speaker. That is, the audio processing unit 1330 converts analog voice signals inputted from the microphone into digital voice signals, or converts digital voice signals inputted from the controller 1360 into analog voice signals. The audio processing unit 1330 can play various audio elements (e.g., audio signals according to a play of an MP3 file) which are generated in the portable terminal according to user's selection.

Still referring to FIG. 13, the touch screen 1340 is an input/output means which performs both an input function and a display function, and includes the display unit 1341 and the touch sensor 1343.

The display unit 1341 displays screen data generated during performance of a function of the portable terminal, and displays state information according to use's key manipulation and function setting. The display unit 1341 can display various screen data related with the state and operation of the portable terminal. The display unit 1341 visually displays several signals and color information outputted from the controller 1360. Particularly, the on and off of the display unit 1341 is controlled under the control of the controller 1360 in an idle mode state. At this time, the display unit 1341 may display an unlocking object transmitted from the controller 1360 on an idle screen when turned on in a locking mode.

The touch sensor 1343 may be placed on the display unit 1341, and may sense a user's touch that contacts the surface of the touch screen 1340. The touch sensor 1343 detects the coordinates where the touch is generated when sensing a user's touch on the surface of the touch screen 1340, and transmits the detected coordinates to the controller 1360. The touch sensor 1343 senses a touch generated by a user, and generates a signal according to the sensed touch and transmits the generated signal to the controller 1360, by which the controller 1360 can perform a function corresponding to an area where a touch is generated according to a transmitted signal in the touch sensor 1343.

Particularly, the touch sensor 1343 senses a user's gesture input. The touch sensor 1343 enters a gesture input mode which can sense a user's gesture input when sensing a specific input in a locking mode. The specific input may be an input generated on the touch screen 1340, or may include an input of a function key for unlocking a locking mode or the like. In addition, if the touch sensor 1343 senses a user's gesture input in the gesture input mode, the touch sensor 1343 transmits the gesture input to the controller 1360. Then, the controller 1360 unlocks a locking mode and executes a function corresponding to a gesture in response to the gesture, and outputs the screen data in the display unit 1341.

The storage unit 1350 may include a ROM (read only memory) and a RAM (random access memory) or the like. The storage unit 1350 can store various data which are generated and utilized in the portable terminal. The data includes data which is generated according to execution of an application of the portable terminal, and all forms of data which generated using the portable terminal or received from the outside (a base station, an opponent portable terminal, and a personal computer or the like) and can be stored. Particularly, the data may preferably include a user interface provided in the portable terminal, various setting information according to the use of the portable terminal, and setting information for unlocking a locking mode using a user's gesture and executing a corresponding function. The storage unit 1350 maps gesture information to function information corresponding to the gesture information and stores the mapping, and such information corresponds to what was explained in the above description on an unlocking object.

Moreover, the storage unit 1350 may store an application for controlling a general operation of the portable terminal and an application for controlling an operation of the portable terminal using a user's gesture of the present invention or the like. The application of the present invention may be an application corresponding to an operation of the present invention as explained with reference to FIGS. 1 to 13. Such applications may be stored in an application storage area (not shown) of the storage unit 1350. In addition, the storage unit 1350 may include one or more buffers which temporarily store data generated during execution of the above-mentioned application.

The controller 1360 performs a general control function on the portable terminal, and controls a signal flow between the elements within the portable terminal. The controller 1360 controls a signal flow among the elements such as the wireless communication unit 1310, the input unit 1320, the audio processing unit 1330, the touch screen and the storage unit 1350 or the like.

The controller 1360 senses a gesture input transmitted by the touch screen 1340 according to an exemplary embodiment of the present invention, and controls the unlocking of a locking mode and execution of a corresponding function in response to the gesture input.

Particularly, if the controller 1360 senses a specific input when the portable terminal is operated in a locking mode, the controller 1360 may display the set unlocking object through the display unit 1341, or may omit the display. The display of such an unlocking object and the omission of the display may be defined according to setting information which is preset by user. In addition, the controller 1360 determines whether the locking mode is unlocked by a gesture input generated on the touch screen 1340. If the controller 1360 senses a user's gesture input through the touch screen 1340, the controller 1360 analyzes a pattern according to the user's gesture, and determines whether or not the gesture corresponds to a preset gesture. If the user's gesture corresponds to the preset gesture, the controller 1360 unlocks the locking mode. In addition, the controller 1360 extracts function information mapped to the user's gesture, and controls prompt execution of a function corresponding to the function information during the unlocking of the locking mode, and controls the output of the screen data.

Likewise, the controller 1360 can control general operations of the present invention as explained with reference to FIGS. 1 to 13. The above-described function control of the controller 1360 may be implemented in the form of software to process the operation of the present invention. In addition, though omitted in FIG. 13, the controller 1360 may include, for example, a baseband module for a mobile communication service of the portable terminal. The baseband module may be included in at least one of the controller 1360 and the wireless communication unit 1310. Further, FIG. 13 illustrates a schematic configuration of the portable terminal for the convenience of illustration. However, the portable terminal of the present invention is not limited to the above-described configuration.

Hence, the portable terminal of the present invention may further include a general configuration such as a digital broadcasting receiving module for receiving and playing digital broadcasting (e.g., mobile broadcasting such as DMB (digital multimedia broadcasting)) and DVM (digital video broadcasting)), a local area communication module (e.g., a Bluetooth communication module) for local area communication, and an Internet communication module for communicating with Internet network and performing Internet functions, but the description and illustration of such a configuration will be omitted here. In addition, a specific element of the portable terminal of the present invention may be removed or be substituted by another element depending on the provided form, which can be easily understood by those skilled in the art.

As explained with reference to FIGS. 1 to 13, according a method and apparatus for unlocking a locking mode of the present invention, one of advantages of the invention is that the unlocking of a locking mode will become much more convenient than known heretofore. According to the present invention, user can unlock a locking mode of a portable terminal by a gesture input, and promptly enter a corresponding function when the locking mode is unlocked. Hence, user can perform the unlocking of a locking mode and execution of a corresponding function by one gesture input. When unlocking a locking mode of a portable terminal by a gesture input, user can selective perform quick dialing, quick execution of a specific application or entrance to an idle screen according to function information mapped to a corresponding gesture. Hence, when using a portable terminal, user's convenience is improved, and quick execution of a user's desired function is possible.

In addition, according to the present invention, a user can quickly and conveniently unlock a locking mode of a portable terminal through a simple gesture input on a touch screen or a touch pad, and can enter a function mapped to the gesture at the same time. Hence, convenience according to use of a portable terminal is provided to user.

In addition, according to the present invention, a user can intuitively recognize a gesture for unlocking a locking mode and a corresponding function by providing a user's gesture information for unlocking a locking mode of a portable terminal and mapped function information on an idle screen. In addition, according to the present invention, by omitting provision of information on an idle screen depending on user's setting, a locking function is provided, and a password function for user's privacy protection can also be provided.

The above-described methods according to the present invention can be realized in hardware or as software or computer code that can be stored in a recording medium such as a CD ROM, a RAM, a floppy disk, a hard disk, or a magneto-optical disk or downloaded over a network, so that the methods described herein can be executed by such software using a general purpose computer, or a special processor or in programmable or dedicated hardware, such as an ASIC or FPGA. As would be understood in the art, the computer, the processor or the programmable hardware include memory components, e.g., RAM, ROM, Flash, etc. that may store or receive software or computer code that when accessed and executed by the computer, processor or hardware implement the processing methods described herein. In addition, it would be recognized that when a general purpose computer accesses code for implementing the processing shown herein, the execution of the code transforms the general purpose computer into a special purpose computer for executing the processing shown herein.

Although exemplary embodiments of the present invention have been described in detail hereinabove, it should be clearly understood that many variations and modifications of the basic inventive concepts herein taught which may appear to those skilled in the present art will still fall within the spirit and scope of the present invention, as defined in the appended claims.

What is claimed is:
1. A method of unlocking a locking mode of a portable terminal having a touchscreen, the method comprising:
displaying a lock screen while the locking mode is active, and detecting, on any surface of a predetermined area of the touchscreen, a gesture in a form of a shape or pattern and displaying a trace of the gesture on the lock screen as the gesture is executed;
determining by a controller whether the detected gesture matches any of a plurality of predetermined shapes or patterns comprising alphanumeric characters; and
when the detected gesture matches one of the plurality of predetermined shapes or patterns, unlocking the locking mode by the controller and executing at least two of a plurality of predetermined executable specific functions mapped to the one of the plurality of predetermined shapes or patterns, wherein each of the plurality of predetermined shapes or patterns is mapped to a set of the plurality of predetermined executable functions;
wherein, the priority of execution of each function of the set of functions is determined according to a user's setting and a predefined setting of the portable terminal.

2. The method of claim 1, further comprising:
displaying locking information identifying that the portable terminal is in the locking mode.

3. The method of claim 2, wherein the displayed locking information includes an icon.

4. The method of claim 2, further comprising displaying gesture information which guides performance of an operation for unlocking the locking mode, and function information related to execution of at least one of the plurality of executable specific functions.

5. The method of claim 4, wherein displaying gesture information on the touchscreen further comprises at least one of:
displaying the executable specific functions, related function information, and a description of each of the executable specific functions;
displaying the executable specific functions and related function information; and
displaying the executable specific functions only.

6. The method of claim 5, wherein the gesture information is displayed on the touchscreen during execution of the locking mode.

7. The method of claim 2, wherein the gesture is detected through at least one of the touchscreen and a touch pad.

8. The method of claim 1, further comprising:
wherein the plurality of executable specific functions comprises an application including at least one of a call application, a phone book, a music player, a browser, an organizer, a file viewer, a messenger, a camera and a gallery.

9. The method of claim 1, wherein the trace comprises moving path information of the gesture and is displayed only during and after execution of the gesture.

10. The method of claim 1, further comprising displaying text instructing input of the gesture to unlock the locking mode, the displayed text overlaying a predetermined portion of the touchscreen in which the trace of the gesture is to be displayed.

11. A method of unlocking a locking mode of a portable terminal having a touchscreen, the method comprising:
displaying a lock screen while the locking mode is active, and detecting, on any surface of a predetermined area of the touchscreen, gesture in a form of a shape or pattern and displaying a trace of the gesture on the lock screen as the gesture is executed;
determining by a controller whether the detected gesture matches any of the plurality of predetermined shapes or patterns comprising alphanumeric characters;
when the detected gesture matches one of the plurality of predetermined shapes or patterns, unlocking the locking mode; and
executing at least two of a plurality of predetermined executable specific functions mapped to the one of the plurality of predetermined shapes or patterns,
wherein each of the plurality of predetermined shapes or patterns is mapped to a set of the plurality of predetermined executable specific functions;
wherein, the priority of execution of each function of the set of functions is determined according to a user's setting and a predefined setting of the portable terminal.

12. The method of claim 11, wherein executing the set of the plurality of executable specific functions includes displaying an idle screen when the locking mode is unlocked.

13. The method of claim 12, wherein the plurality of executable specific functions comprises an application including at least one of a call application, a phone book, a music player, a browser, an organizer, a file viewer, a messenger, a camera and a gallery.

14. The method of claim 13, wherein executing the one of the executable specific functions comprises executing the call application utilizing function information.

15. The method of claim 14, wherein the function information comprises a phone number.

16. The method of claim 12, further comprising executing the set of the executable specific functions using function information, the function information mapped to the one of the plurality of shapes or patterns.

17. The method of claim 12, further comprising:
displaying locking information that identifies the locking mode when activating a gesture input mode in which the portable terminal detects the gesture.

18. The method of claim 11, wherein the trace comprises moving path information of the gesture as it is detected on the touchscreen, and is displayed only during and after execution of the gesture.

19. The method of claim 11, further comprising displaying text instructing input of the gesture to unlock the locking mode, the displayed text overlaying a predetermined portion of the touchscreen in which the trace of the gesture is to be displayed.

20. A portable terminal comprising:
a display unit having a touchscreen;
a storage unit for storing a plurality of shapes or patterns comprising alphanumeric characters, each of the plurality of shapes or patterns being mapped to a set of a plurality of executable specific functions; and
a controller for:
displaying a lock screen while a locking mode of the portable terminal is active, and sensing, on any surface of a predetermined area of the touchscreen, a gesture in a form of a shape or pattern and displaying a trace of the gesture on the lock screen as the gesture is executed;
determining whether the sensed gesture matches any of the plurality of shapes or patterns; and
when the sensed gesture matches one of the plurality of shapes or patterns, unlocking the locking mode by the controller and executing at least two of the plurality of executable specific functions mapped to the one of the plurality of shapes or patterns,
wherein, the priority of execution of each function of the set of functions is determined according to a user's setting and a predefined setting of the portable terminal.

21. The portable terminal of claim 20, wherein the controller further:
extracts function information mapped to the one of the plurality of shapes or patterns when the locking mode is unlocked; and
executes the set of executable specific functions utilizing the function information mapped to the one of the plurality of shapes or patterns and displaying a result of the execution.

22. The portable terminal of claim 21, wherein the set of the plurality of executable specific functions comprises an application that is executed upon unlocking the locking mode, and
the application includes at least one of, a call application, a phone book, a music player, a browser, an organizer, a file viewer, a messenger, a camera and a gallery, wherein for the call application and the phone book, the function information includes a particular contact.

23. The portable terminal of claim 20,
wherein the set of the plurality of executable specific functions comprises an application that is executed upon unlocking the locking mode, and
wherein the trace comprises moving path information of the gesture and is displayed only during and after execution of the gesture.

24. The portable terminal of claim 20, the controller further for controlling the display unit to display text instructing input of the gesture to unlock the locking mode, the displayed text overlaying a predetermined portion of the touchscreen in which the trace of the gesture is to be displayed.

25. A portable terminal comprising:
a display unit having a touchscreen; and
a processor configured to:
control the display unit to display a lock screen while a locking mode is active and receive, via the touchscreen, a touch handwriting gesture on a user interface screen of the locking mode,
obtain moving path information associated with the touch handwriting gesture,
display a trace of the touch handwriting gesture on the lock screen via the user interface screen of the locking mode as the touch handwriting gesture is received, the displayed trace representing the obtained moving path information associated with the touch gesture,
determine whether the received touch handwriting gesture matches one of a plurality of alphanumeric characters, each of the plurality of alphanumeric characters being mapped to a set of a plurality of executable functions, and
when the received touch handwriting gesture matches one of the plurality of alphanumeric characters, changing from the user interface screen with the displayed touch gesture trace to a screen executing at least two of the plurality of executable functions mapped to the one of the plurality of alphanumeric characters,
wherein, the priority of execution of each function of the set of functions is determined according to a user's setting and a predefined setting of the portable terminal.

* * * * *